United States Patent
Miyao

(10) Patent No.: US 6,219,337 B1
(45) Date of Patent: Apr. 17, 2001

(54) ATM NETWORK ENABLING QUICK AND RELIABLE RECONSTRUCTION BY DISTRIBUTING A SERIES OF STEPS TO COMMUNICATION NODES TO FOLLOW A TIME-VARYING TRAFFIC LOAD

(75) Inventor: Yasuhiro Miyao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/909,890

(22) Filed: Aug. 12, 1997

(30) Foreign Application Priority Data

Aug. 12, 1996 (JP) .................................................. 8-212701

(51) Int. Cl.$^7$ .................................................. H04L 12/26
(52) U.S. Cl. ........................................... 370/230; 370/236
(58) Field of Search .................................. 370/230, 235, 370/236, 252, 253, 395, 397, 399, 409, 468

(56) References Cited

U.S. PATENT DOCUMENTS

| | | | |
|---|---|---|---|
| 4,905,233 | * 2/1990 | Cain et al. ............................ | 370/237 |
| 5,253,247 | * 10/1993 | Hirose et al. ........................ | 370/232 |
| 5,333,131 | * 7/1994 | Tanabe et al. ....................... | 370/397 |
| 5,420,859 | * 5/1995 | Takase et al. ........................ | 370/397 |
| 5,467,348 | * 11/1995 | Fujii et al. ........................... | 370/468 |
| 5,633,866 | * 5/1997 | Callon ................................. | 370/397 |
| 5,649,108 | * 7/1997 | Spiegel et al. ....................... | 709/241 |
| 5,703,879 | * 12/1997 | Proctor et al. ....................... | 370/398 |
| 5,726,977 | * 3/1998 | Lee ...................................... | 370/235 |
| 5,727,051 | * 3/1998 | Holender .............................. | 379/112 |
| 5,737,313 | * 4/1998 | Kolarov et al. ...................... | 370/234 |
| 5,812,532 | * 9/1998 | Oki et al. ............................. | 370/255 |
| 5,854,903 | * 12/1998 | Morrison et al. .................... | 709/249 |

FOREIGN PATENT DOCUMENTS

| | | |
|---|---|---|
| 4-98940 | 3/1992 | (JP) . |
| 4-172733 | 6/1992 | (JP) . |
| 5153154 | 6/1993 | (JP) . |
| 5-252226 | 9/1993 | (JP) . |
| 5268245 | 10/1993 | (JP) . |
| 7-99526 | 4/1995 | (JP) . |

OTHER PUBLICATIONS

An Office Action Issued by the Japanese Patent Office on Jun. 3, 1998 for the Corresponding Japanese Application. Included is a Translation of the Japanese Examiner's Comments Made in the Office Action.

Japanese Office Action issued Apr. 21, 1999 in corresponding Japanese application. English translation of portions of Apr. 21, 1999 Japanese Office Action.

Y. Kato, et al., "Implementation Performance Evaluation for Self–Sizing Network Operation", Technical Report of EIECE, SSE95–122, Dec., 1995, pp. 37–42.

* cited by examiner

Primary Examiner—Chau Nguyen
Assistant Examiner—Jasper Kwoh
(74) Attorney, Agent, or Firm—Ostrolenk, Faber, Gerb & Soffen, LLP

(57) ABSTRACT

When a virtual channel handler terminating a virtual path tries to expand its capacity by signalling and the trial has failed, the virtual channel handler delivers an expansion request to a reconstruction server. Supplied with the expansion request, the server delivers a reduction request to each of virtual channel handlers terminating other virtual paths passing the same physical links as the virtual path. Supplied with the reduction request, each of the virtual channel handlers calculates a required VP capacity value, reduces by signalling current capacity to the required VP capacity thus calculated, and delivers to the server a reduction response including a reduction value. The server is responsive to the reduction response and delivers an expansion response to the virtual channel handler with a minimum reduction value as an expandable value. The virtual channel handler is responsive to the expansion response and calculates new VP capacity which is a sum of the current capacity and the expandable value to expand the VP capacity by signalling.

8 Claims, 15 Drawing Sheets

FIG. 3A

| VP NUMBER | TRAFFIC | PERFOR- MANCE | VP CAPACITY |
|---|---|---|---|
|  |  |  |  |

FIG. 3B

| PHYSICAL LINK NUMBER | NODE NUMBER | IDLE CAPACITY |
|---|---|---|
|  |  |  |

FIG. 3C

| VP NUMBER | PHYSICAL LINK NUMBER |
|---|---|
|  |  |

EXPANSION REQUEST MESSAGE

| 0 | 0 | EXPANSION CANDIDATE VP NUMBER | REQUESTED EXPANSION VALUE |
|---|---|---|---|
|   |   |   |   |

REDUCTION REQUEST MESSAGE

| 1 | 0 | REDUCTION CANDIDATE VP NUMBER | don't care |
|---|---|---|---|
|   |   |   |   |

REDUCTION RESPONSE MESSAGE

| 1 | 1 | REDUCTION CANDIDATE VP NUMBER | RESPONDED REDUCTION VALUE |
|---|---|---|---|
|   |   |   |   |

EXPANSION RESPONSE MESSAGE

| 0 | 1 | EXPANSION CANDIDATE VP NUMBER | RESPONDED EXPANSION VALUE |
|---|---|---|---|
|   |   |   |   |

FIG. 7A

| TERMINATING VCH NUMBER | REDUCTION CANDIDATE VP NUMBER | PHYSICAL LINK NUMBER | IDLE CAPACITY |
|---|---|---|---|
|   |   |   |   |

FIG. 7B

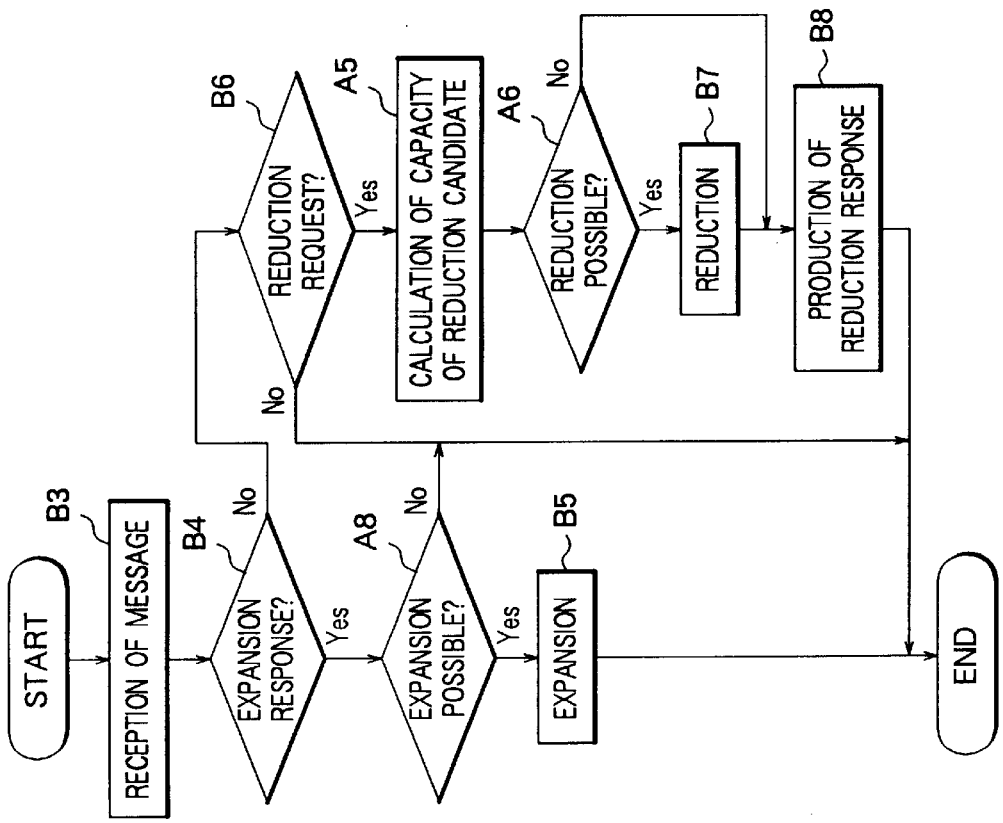
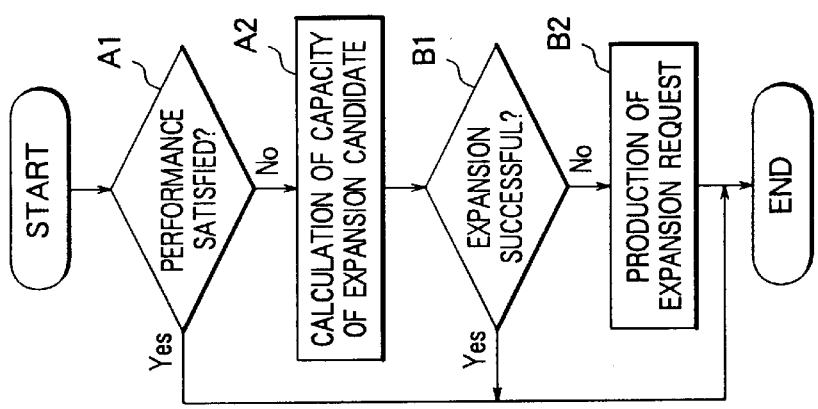
FIG. 8A

FIG. 11A

REDUCTION REQUEST MESSAGE

| EXPANSION CANDIDATE VP NUMBER | don't care | HOP NUMBER | PHYSICAL LINK NUMBER | ... | PHYSICAL LINK NUMBER |
|---|---|---|---|---|---|
| 0 | | | | | |

{ROUTING LIST}

REDUCTION RESPONSE MESSAGE

| EXPANSION CANDIDATE VP NUMBER | RESPONDED REDUCTION VALUE | NUMBER OF COMMON LINKS | PHYSICAL LINK NUMBER | ... | PHYSICAL LINK NUMBER |
|---|---|---|---|---|---|
| 1 | | | | | |

{COMMON PHYSICAL LINKS}

FIG. 11B

| PHYSICAL LINK NUMBER | IDLE CAPACITY |
|---|---|
| | |

ATM NETWORK ENABLING QUICK AND RELIABLE RECONSTRUCTION BY DISTRIBUTING A SERIES OF STEPS TO COMMUNICATION NODES TO FOLLOW A TIME-VARYING TRAFFIC LOAD

BACKGROUND OF THE INVENTION

This invention relates to a reconstructible network and, in particular, to an ATM network allowing logical reconstruction by modifying the capacity of a virtual connection.

A conventional reconstructible network of the type is described, for example, in an article entitled "Implementation Performance Evaluation for Self-sizing Network Operation" written by Yuka KATO and three others and contributed to Technical Report of IEICE (Institute of Electronics, Information and Communication Engineers), SSE-95-122 (December, 1995), pp. 37–42. As described in the KATO et al. article, the reconstructible network is aimed at reassigning physical network resources to meet variation in traffic load upon virtual paths in an ATM network in order to assure network performance.

In an asynchronous transfer mode (abbreviated ATM), a fixed-length block called a cell is used as a unit in multiplexing and exchange for a physical link. The cell contains an identifier indicative of virtual connection through which information is to be transferred. The virtual connection includes a virtual path (VP) and a virtual channel (VC). Within the cell, the identifier for the virtual connection is partly assigned to the virtual path and partly assigned to the virtual channel. As a result, a particular virtual path accommodates a plurality of virtual channels. A particular physical link accommodates a plurality of virtual paths.

Referring to FIG. 1, a conventional reconstructible network comprises a plurality of virtual channels (VC's) 1, a plurality of virtual channel handlers (VCH's) 2 (2-1 through 2-6 in the figure), a plurality of virtual paths (VP's) 3 (3-1 through 3-3 in the figure), a plurality of virtual path handlers (VPH's) 4 (4-1 through 4-4 in the figure), a plurality of physical links 5 (5-1 through 5-3 in the figure) accommodating the virtual paths 3, and a network managing system (NMS) 6.

The virtual channel handlers 2 terminate the virtual paths 3 and make the virtual paths 3 accommodate the virtual channels 1 in response to accommodation requests. Such accommodation requests (for example, telephone calls) are randomly produced so that the accommodation of the virtual channels 1 into the virtual paths 3 may not completely be successful. The probability of unsuccessfulness is used as a measure for the performance of the virtual paths 3. A product of the frequency of production of the accommodation requests and the required accommodation time is called a traffic.

The virtual path handlers 4 terminate the virtual paths 3 and make the physical links 5 accommodate the virtual paths 3. The virtual paths 3 are handled as channel groups comprising a plurality of channels such as telephone channels. The accommodation of the virtual paths 3 into the physical links 5 are definitely carried out.

The virtual channels 1 and the virtual paths 3 are collectively called the virtual connection while the virtual channel handlers 2 and the virtual path handlers 4 are collectively called communication nodes.

Supplied with a capacity setting request message from the network managing system 6, each of the virtual channel handlers 2 and the virtual path handlers 4 modifies a capacity managing table. In addition, each of the virtual channel handlers 2 terminating the virtual paths 3 modifies a traffic shaper to adjust a cell flow in each virtual path 3 and, after completion of the modification, returns a capacity setting response message. Supplied with a traffic/performance information request message, the virtual channel handler 2 returns a traffic/performance response message to the network managing system 6. Thus, the network managing system 6 controls and manages the virtual channel handlers 2 and the virtual path handlers 4 by the use of the messages transmitted and received in a polling fashion.

The virtual channel handlers 2 and the virtual path handlers 4 as the communication nodes are respectively assigned with node numbers which can be uniquely identified within the network. The physical links 5 connected to one of the communication nodes are assigned with port numbers which can be uniquely identified within the communication node in consideration. Therefore, a particular one of the physical links 5 downward from a particular one of the communication nodes can be uniquely identified within the network with reference to a combination of a specific node number and a specific port number. Such combination of the specific node number and the specific port number will hereafter be called a physical link number.

In order to reassign network resources from those virtual paths having spare capacity to those virtual paths requiring additional capacity, the network managing system 6 periodically collects traffic/performance information from the virtual channel handlers 2 to evaluate the performance, calculates VP capacity required for each VP path, and sets the capacity in each of the virtual path handlers 4 and the virtual channel handlers 2. To this end, the network managing system 6 is connected to all of the virtual channel handlers 2 and the virtual path handlers 4 within the network through managing virtual channels.

Referring to FIG. 2, the network managing system 6 comprises a database (DB) section 10, a control section 11, and a message transmit/receive section 12.

The database section 10 comprises a traffic database 101, a topology database 102, and a routing list database 103.

As illustrated in FIG. 3A, the traffic database 101 holds a traffic information table storing traffic and performance information related to the traffic and the performance of each virtual path 3 within the network and collected from each virtual channel handler 2. Specifically, the traffic information table comprises first through fourth entries indicative of a VP number, traffic information, performance information, and a VP capacity, respectively. The VP number comprises a set of a node number, a port number, and a VP identifier uniquely identified by the port number. Thus, the VP number is uniquely identified within the network.

As illustrated in FIG. 3B, the topology database 102 holds a topology information table indicative of the state of connection of the virtual channel handlers 2 and the virtual path handlers 4 as well as idle capacity of the physical links 5 connecting the virtual channel handlers 2 and the virtual path handlers 4. Specifically, the topology information table comprises first through third entries indicative of the physical link number of an adjacent node, the node number, and the idle capacity.

As illustrated in FIG. 3C, the routing list database 103 holds a routing list table indicative of a routing list comprising a sequence of the physical link numbers of those physical links through which each virtual path 3 within the network passes. Specifically, the routing list table comprises first and second entries indicative of the VP number and the physical link number.

The control section 11 comprises a capacity managing unit 111, a performance managing unit 112, a capacity calculating unit 113, a capacity setting unit 114, and a reduction candidate selecting unit 115.

The performance managing unit 112 periodically collects in a polling fashion the traffic and the performance information of a virtual channel 1 accommodated in a virtual path 3 terminated by a particular virtual channel handler 2 in consideration, and renews the traffic database 101. In response to a request from the capacity managing unit 111, the performance managing unit 112 acquires from the traffic database 101 the performance information of the virtual path 3 and evaluates whether or not the performance is satisfactory.

The capacity calculating unit 113 acquires from the traffic database 101 the traffic information and the performance information of the virtual path 3 specified by the capacity managing unit 111, calculates the required capacity for the virtual path 3, and, if necessary, renews the VP capacity in the traffic database 101.

The capacity setting unit 114 successively delivers capacity setting request messages to all of the virtual path handlers 4 and the virtual channel handlers 2 designated in the routing list for the virtual path 3 specified by the capacity managing unit 111 to carry out capacity setting operation. When capacity setting response messages are sent from all of the virtual path handlers 4 and the virtual channel handlers 15 in consideration, the capacity setting unit 114 renews the VP capacity in the traffic database 101 and the idle capacity in the topology database 102 for all of the physical links 5 present in the route of the virtual path 3.

The reduction candidate selecting unit 115 refers to the routing list database 103 and searches another virtual path 3 accommodated in the physical link common to an expansion-candidate virtual path 3 with its routing list specified. If it is found, the routing list for such another virtual path 3 is extracted.

The capacity managing unit 111 carries out judgement and execution of expansion or reduction of the VP capacity by the use of the performance managing unit 112, the capacity calculating unit 113, the capacity setting unit 114, and the reduction candidate selecting unit 115.

The message transmit/receive section 12 comprises a message transmitter 121 and a message receiver 122.

The message transmit/receive section 12 is connected through managing virtual channels to all of the virtual channel handlers 2 and the virtual path handlers 4.

The message transmitter 121 transmits the request messages to the virtual channel handlers 2 and the virtual path handlers 4. The message receiver 122 receives the response messages from the virtual channel handlers 2 and the virtual path handlers 4.

Referring to FIG. 4, operation of the network managing system 6 in FIG. 2 will be described.

In a step A1, the capacity managing unit 111 makes the performance managing unit 112 judge, with reference to the traffic database 101, whether or not performance requirement is satisfied for a particular virtual path 3. If it is satisfied, the operation comes to an end.

If the performance requirement is not satisfied, the step A1 proceeds to a step A2. In the step A2, the capacity managing unit 111 makes the capacity calculating unit 113 calculate, as a new VP capacity, the required VP capacity for the particular virtual path 3 as an expansion candidate. A difference between the new VP capacity thus calculated and a current capacity is obtained as a requested expansion value.

The step A2 is followed by a step A3. In the step A3, the capacity managing unit 111 makes the capacity setting unit 114 refer to the topology database 102 and examine whether or not each of the physical links 5 on the route of the virtual path 3 can be expanded because it has the idle capacity sufficient to satisfy the requested expansion value calculated in the step A2. If expansion is possible, the step A3 proceeds to a step A10.

If the expansion is impossible, the step A3 proceeds to a step A4. In the step A4, the capacity managing unit 111 makes the reduction candidate selecting unit 115 select as a reduction candidate virtual path another virtual path 3 passing through the physical link 5 common to the expansion candidate virtual path to obtain the VP number of the reduction candidate virtual path and the physical link number of the physical link 5 used in common. If no reduction candidate virtual path is selected, the operation comes to an end.

If any reduction candidate virtual path is selected, the step A4 proceeds to a step A5 in which the capacity managing unit 111 makes the capacity calculating unit 113 calculate as a new capacity the required VP capacity for each reduction candidate virtual path 3.

The step A5 is followed by a step A6. In the step A6, calculation is made of the difference between the new capacity thus calculated and the current capacity for each reduction candidate virtual path. Specifically, the current capacity is subtracted from the new capacity to obtain the difference. If the difference has a minus value, the reduction in capacity is allowable. Based on this knowledge, judgement is made about whether or not any virtual path 3 can be reduced in capacity. If no virtual path 3 can be reduced in capacity, expansion in capacity of the expansion candidate virtual path is impossible and the operation comes to an end.

If any virtual path 3 is reducible in capacity, the step A6 proceeds to a step A7. In the step A7, the capacity managing unit 111 makes the capacity calculating unit 113 calculate, with reference to the difference in VP capacity calculated in the step A6, the physical link number of the physical link 5 used in common by the reduction candidate virtual path and the expansion candidate virtual path, and with reference to the routing list of the expansion candidate virtual path 3, the total sum of newly available capacity in each physical link on the route of the expansion candidate virtual path. The newly available capacity results from reduction in capacity of the reduction candidate virtual path. The minimum total sum is used as an allowable expansion value for the VP capacity. A smaller one of the allowable expansion value and the requested expansion value calculated in the step A2 is selected as an expandable value. This operation prevents the expansion over the requested expansion value.

Then, the step A7 is followed by a step A8 in which examination is made about whether or not the expansion is possible because the expandable value is not equal to zero. If it is not possible, the operation comes to an end.

If the expandable value is not equal to zero and the expansion is possible, the step A8 proceeds to a step A9. In the step A9, the capacity managing unit 111 makes the capacity setting unit 114 modify the capacity of each of the capacity-reducible virtual paths 3 into the new capacity calculated in the step A5. The step A9 is followed by a step A10.

In the step A10, the capacity managing unit 111 makes the capacity setting unit 114 set a new capacity which is a total sum of the expandable value calculated in the step A7 and the current capacity.

Now, operation of the prior art in FIG. 1 will be described.

The capacity managing unit 111 in a reconstructible server 7 (not shown in FIG. 1) makes the performance managing unit 112 evaluate whether or not the performance of the virtual path 3-1 is satisfactory (step A1). Since the performance is not satisfactory, expansion of the capacity is desired. However, no idle capacity is present in the physical links 5-1 and 5-2 in the route of the virtual path 3-1. In this state, expansion is impossible. Therefore, the capacity managing unit 111 makes the reduction candidate selecting unit 115 select the other virtual paths 3-2 and 3-3 sharing the physical links 5-1 and 5-2 with the virtual path 3-1, respectively. Then, the capacity managing unit 111 makes the capacity calculating unit 113 calculate the required capacity for each of the virtual paths 3-2 and 3-3 (step A5).

As a result, the virtual paths 3-2 and 3-3 are judged reducible so that the capacity of each of the physical links 5-1 and 5-2 becomes available. A smaller value of the available capacity is selected as an expansion value for the virtual path 3-1 (step A7).

Then, the capacity managing unit 111 instructs the virtual channel handler 2-2, the virtual path handlers 4-1, 4-4, and 4-2, and the virtual channel handler 2-3 to reduce the virtual path 3-2. Likewise, the capacity managing unit 111 instructs the virtual channel handler 2-4, the virtual path handlers 4-2, 4-4, and 4-3, and the virtual channel handler 2-5 to reduce the virtual path 3-3 (step A9).

Finally, the capacity managing unit 111 instructs the virtual channel handlers 2-1 and 2-6 to expand the virtual path 3-1 (step A10).

The conventional reconstructible network described above is disadvantageous in that the performance can not be assured following rapid variation in traffic.

As described above, the network managing system exclusively and successively executes all those steps required in capacity reassignment, including performance management, capacity calculation, capacity setting, and reduction candidate selection.

In addition, a series of these steps are executed retrieving and renewing the databases storing various information for the whole network, including the information related to connection between the physical links and the communication nodes and the idle capacity of the physical links, the information of the physical links in the route of the virtual connection, and the information related to the traffic and the performance.

Thus, it takes a long time to complete capacity expansion for the virtual connection whose performance is not satisfactory.

SUMMARY OF THE INVENTION

It is an object of this invention to provide a communication network which can be quickly reconstructed.

According to a first aspect of this invention, a reconstructible network comprises communication nodes each of which carries out performance management, calculation of required capacity, and expansion/reduction of capacity with respect to virtual connection terminated by the communication node in consideration, and a reconstruction server for carrying out selection of a reduction candidate virtual path.

More specifically, each of the communication nodes terminating the virtual connection comprises performance managing means (142 in FIG. 6A) for judging whether or not the expansion of capacity is required, capacity calculating means (113 in FIG. 6A) for calculating the required capacity upon judging that the expansion is required, and capacity setting means (143 in FIG. 6A). The reconstruction server comprises reduction candidate selecting means (172 in FIG. 6B) for selecting from all virtual paths defined within the network another virtual path accommodated in a same physical link.

According to another aspect of this invention, a reconstructible network comprises communication nodes each of which carries out not only performance management, calculation of required capacity, and expansion/reduction of capacity with respect to virtual connection terminated by the communication node in consideration but also selection of a reduction candidate virtual path.

More specifically, each of the communication nodes terminating the virtual connection comprises performance managing means(142 in FIG. 12), calculating means (113 in FIG. 12), capacity setting means (143 in FIG. 12), reduction candidate selecting means (202 in FIG. 12) for selecting, among virtual paths terminated by the communication node in consideration, any virtual path accommodated in a physical link contained in a reduction request message, message producing means (203 in FIG. 12) for producing messages containing information of a set of all physical links in the route of virtual connection judged as an expansion candidate in order to make a reduction request to each communication node terminating other virtual connection.

Calculation of the required capacity and modification of the capacity for the virtual paths are distributedly carried out by respective virtual channel handlers terminating the virtual paths. On the other hand, selection of the virtual path to be reduced in capacity so as to enable expansion in capacity of a particular virtual path is concentratedly carried out by the reconstruction server within the network.

Alternatively, selection of the virtual path to be reduced in capacity is carried out by each virtual channel handler supplied from a particular virtual channel handler terminating an expansion candidate virtual path with information of a set of all physical links in the route of the expansion candidate virtual path.

BRIEF DESCRIPTION OF THE DRAWING

FIGS. 3A through 3C show information tables of a traffic database, a topology database, and a routing list, respectively;

FIGS. 7A and 7B show an information table in a current database and a format of a control message used in the first embodiment, respectively;

FIGS. 8A and 8B are flow charts for describing operation of the virtual channel handler and the reconstruction server illustrated in FIGS. 6A and 6B, respectively;

FIGS. 11A and 11B show a format of a control message and an information table of a current database used in the second embodiment, respectively;

DESCRIPTION OF THE PREFERRED EMBODIMENTS

Now, description will be made about this invention with reference to the drawings.

Figure 1:
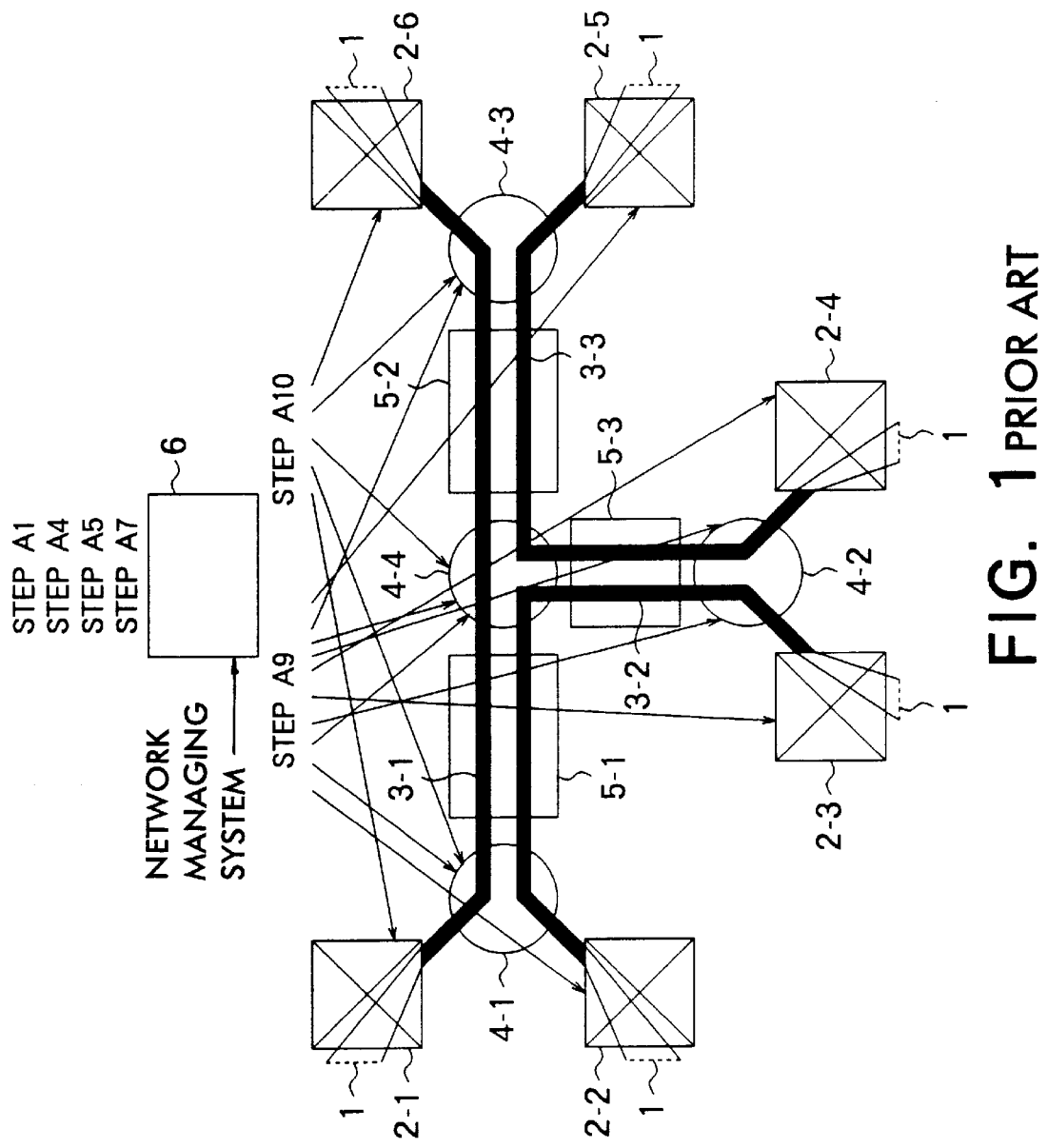
FIG. 1 is a schematic block diagram for describing the structure and the operation of a conventional network.
Figure 2:
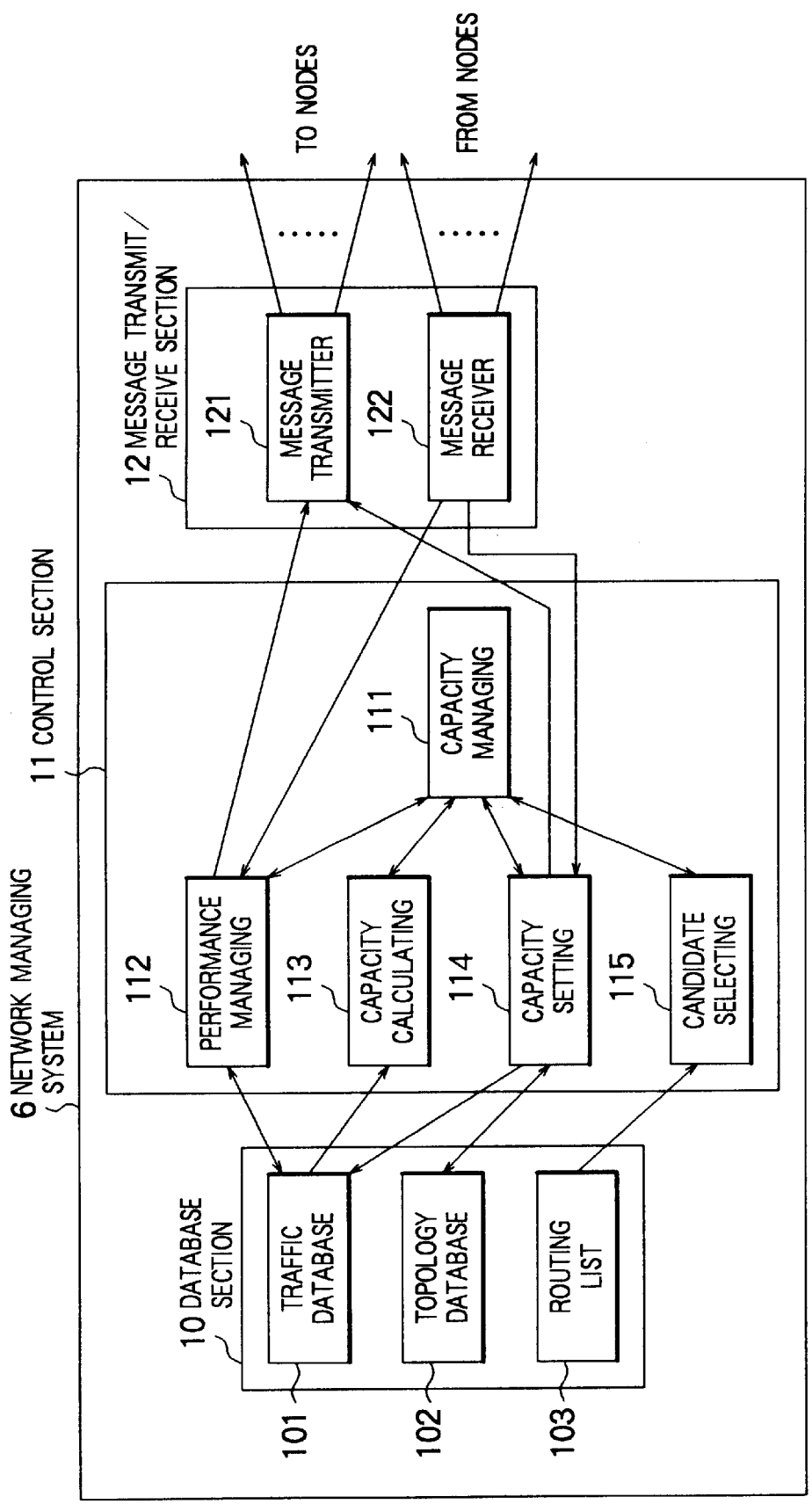
FIG. 2 is a block diagram of a network managing system illustrated in FIG. 1.
Figure 4:
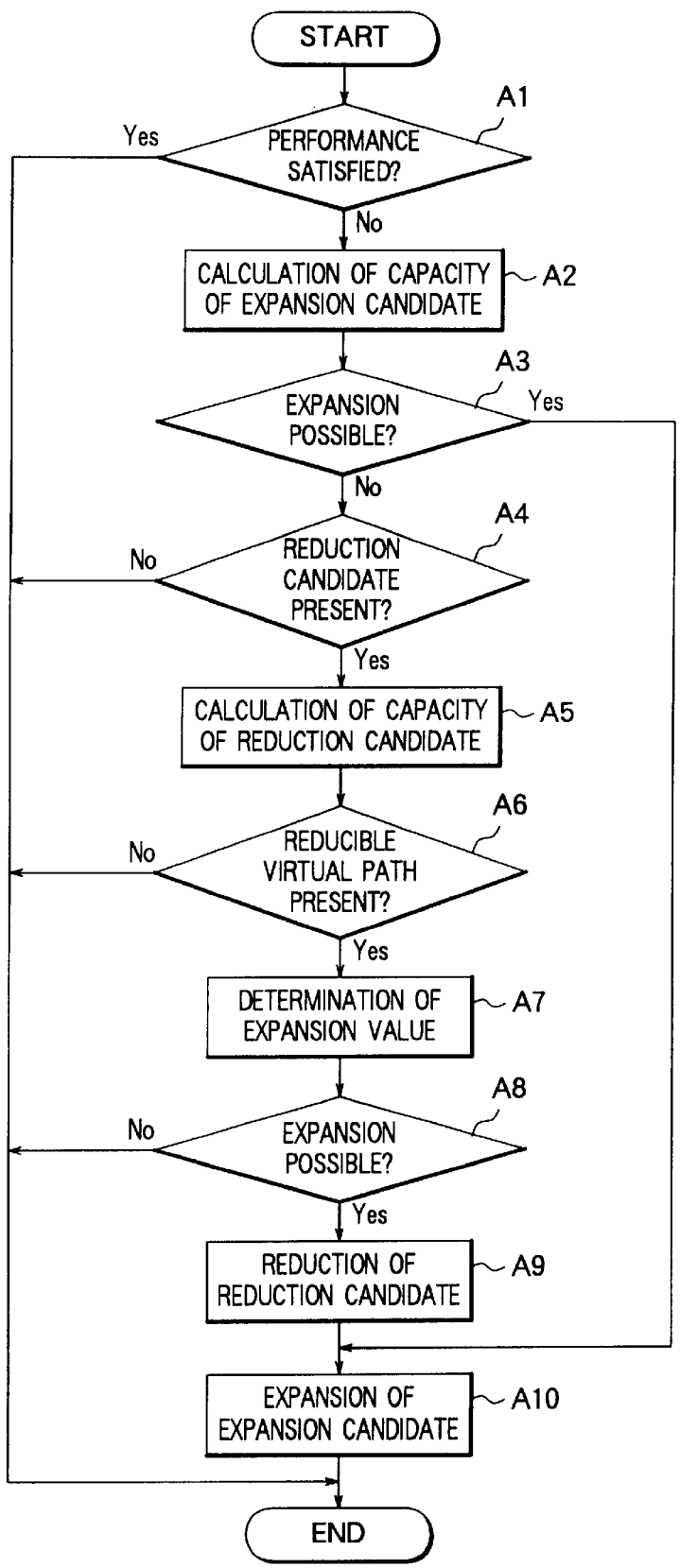
FIG. 4 is a flow chart for describing the operation of the network managing system in FIG. 2.
Figure 5:
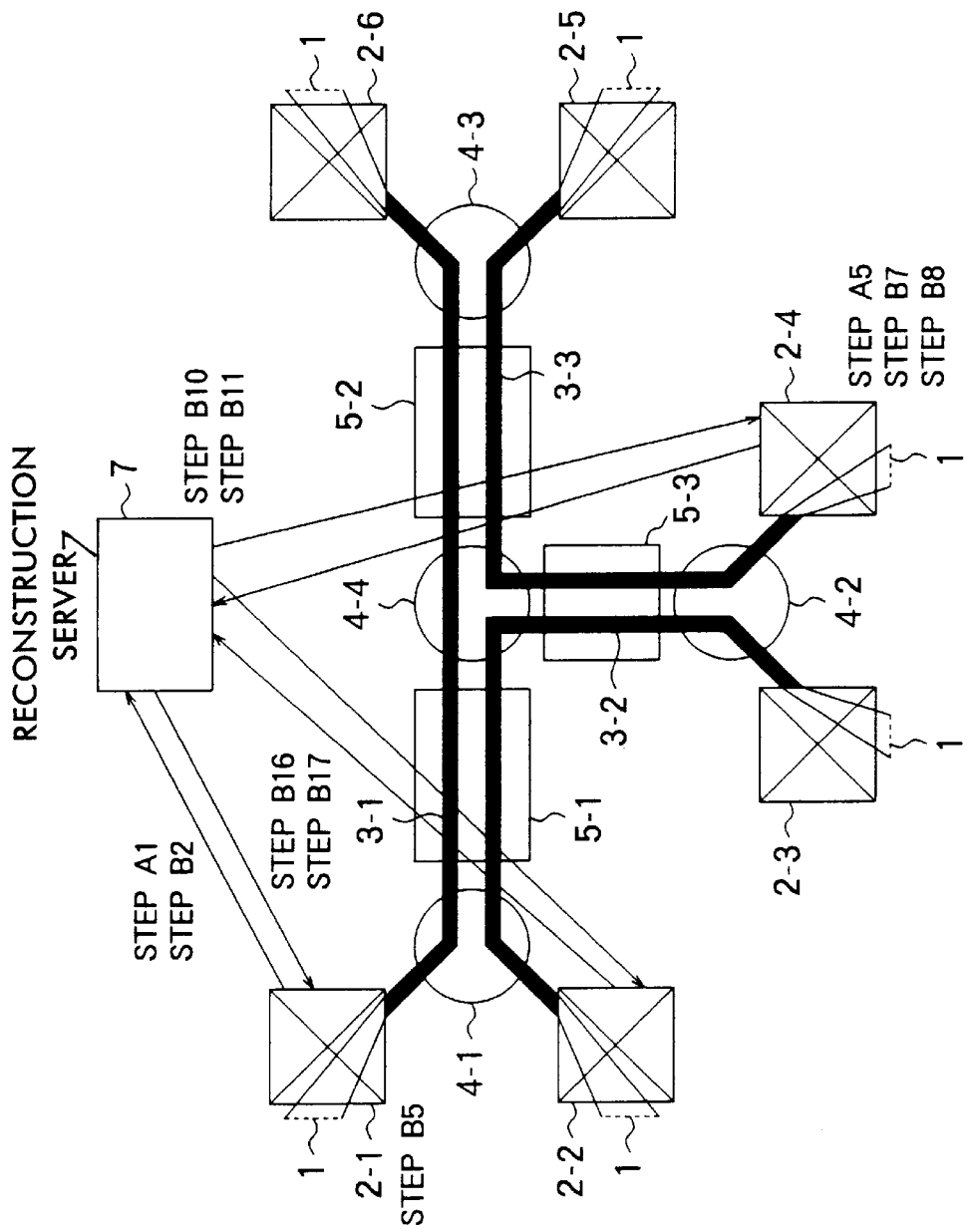
FIG. 5 is a schematic block diagram for describing the structure and the operation of a network according to a first embodiment of this invention.

Referring to FIG. 5, a reconstructible network according to a first embodiment of this invention comprises a plurality of virtual channels (VP's) 1, a plurality of virtual channel handlers (VCH's) 2, a plurality of virtual paths (VP's) 3, and a plurality of virtual path handlers (VPH's) 4, and a plurality of physical links 5, and a reconstruction server 7.

Each of the virtual paths 3 is assigned with a bandwidth which will be referred to as VP capacity.

The virtual channel handlers 2 and the virtual path handlers 4 modify the VP capacity of each of the virtual paths 3 through signalling. Such modification in capacity is carried out in a manner which will presently be described.

Specifically, a particular virtual channel handler 2 terminating a particular virtual path 3 produces a capacity modification request message to be transferred to a particular virtual path handler 4 which is a next node on a route.

The modification in capacity is executed if it is possible on the physical link 5 connected to the virtual path handler 4 in consideration. Then, the capacity modification request message is transferred to another virtual path handler 4 which is a next following node.

If the modification in capacity is impossible on any node to which the message is transferred, a capacity modification response message indicative of failure of the modification in capacity is sent back on the route in a reverse direction.

Each node receiving the capacity modification response message indicative of the failure of the modification in capacity recovers an initial capacity and sends back the capacity modification response message to the virtual channel handler 2 originating the capacity modification request message.

On the other hand, if the modification in capacity is successful in each physical link on the route, the capacity modification request message is transferred to a destination virtual channel handler 2 terminating the other end of the virtual path 3. In this event, the destination virtual channel handler 2 sends back a capacity modification response message indicative of success of the modification in capacity to the virtual channel handler 2 originating the capacity modification request message.

The virtual channel handler 2 collects and monitors the traffic and the performance information in the virtual path 3 terminated by the virtual channel handler 2, calculates required VP capacity from the traffic and the performance information, and modifies the VP capacity of the virtual path 3 terminated by the virtual channel handler 2. In case of the failure in modification, an expansion request message is sent to the server 7. When an expansion response message is returned, expansion in capacity is carried out to a value specified in the expansion response message.

The reconstruction server 7 is connected to control virtual channels to all virtual channel handlers 2 within the network.

When the virtual path 3 is initialized through signalling, the virtual channel handler 2 records its routing list in the reconstruction server 7.

Supplied with the expansion request message from the virtual channel handler 2, the reconstruction server 7 extracts, as a reduction candidate, another virtual path 3 sharing a common physical link 5 with an expansion candidate and delivers a reduction request message to another virtual channel handler 2 terminating the above-mentioned another virtual path 3. When the reduction response message is sent back from the above-mentioned another virtual channel handler 2 to which the reconstruction server 7 delivers the reduction request message, the reconstruction server 7 sends back the expansion response message including an expansion value to the virtual channel handler 2 originating the expansion request message.

Figure 6A:
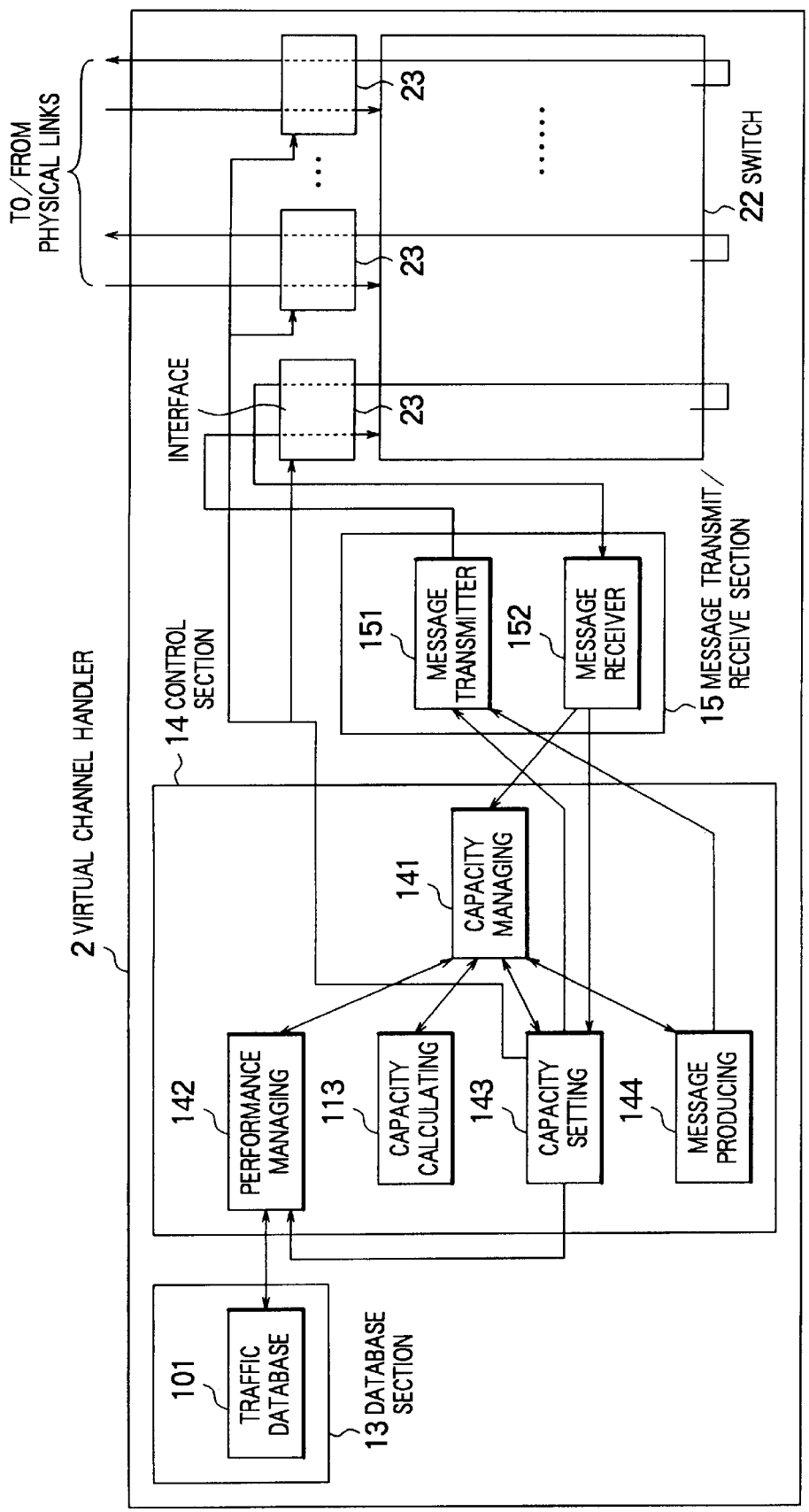
FIGS. 6A and 6B are block diagrams of a virtual channel handler and a reconstruction server illustrated in FIG. 5, respectively.

Referring to FIG. 6A, each virtual channel handler 2 comprises a database section 13, a control section 14, a message transmit/receive section 15, a switch 22, and an internal interface 23.

The database section 13 comprises a traffic database 101.

In the traffic database 101, the VP capacity is recorded and modified upon establishment of a new virtual path and modification in VP capacity through signalling.

The control section 14 comprises a capacity managing unit 141, a capacity calculating unit 113, a performance managing unit 142, a connection control unit 143, and a message producing unit 144.

The connection control unit 143 transmits and receives signalling messages through a message transmitter 151 and a message receiver 152 to reset the capacity of the virtual path 3 and set a new virtual channel 1 in the virtual path 3. Upon resetting the capacity of the virtual path 3, the connection control unit 143 requests the internal interface 23 to re-adjust a cell flow for each virtual path so as to modify parameters of a traffic shaper. When the new virtual channel 1 is set, the connection control unit 143 defines an identification number of the virtual channel within the virtual path 3.

With reference to the information from the connection control unit 143, the performance managing unit 142 measures the traffic and the information related to a call loss ratio. The traffic is a frequency of occurrence of a VC setting request for setting a new virtual channel in each virtual path 3 terminated by the virtual channel handler 2. The call loss ratio is a ratio of rejection of the VC setting request as a result of lack of the idle capacity sufficient to set the new virtual channel in the virtual path. Based on the result of measurement, the traffic database 101 is renewed. Instructed by the capacity managing unit 141, the performance managing unit 142 judges with reference to the traffic database 101 whether or not performance requirement of the virtual path 3 is satisfied.

The message producing unit 144 produces the expansion request message and the reduction response message addressed to the reconstruction server 7.

The capacity managing unit 141 carries out judgement upon expansion and reduction in capacity and execution of expansion and reduction in capacity by the use of the capacity calculating unit 113, the performance managing unit 142, the capacity setting unit 143, and the message producing unit 144.

The message transmit/receive section 15 comprises the message transmitter 151 and the message receiver 152.

The message transmitter 151 delivers the signalling message produced by the capacity setting unit 143 to the virtual path handler 4 directly connected to the virtual channel handler 2. The message transmitter 151 transmits to the reconstruction server 7 the expansion request or the reduction request message supplied from the capacity managing unit 141.

Supplied with the signalling message from the virtual path handler 4 directly connected to the virtual channel handler 2, the message receiver 152 delivers the signalling message to the capacity setting unit 143. Supplied with the expansion response or the reduction request message from the reconstruction server 7, the message receiver 152 delivers the message to the capacity managing unit 141.

The switch 22 directs from an input port to a desired output port a fixed-length cell as a unit of information transfer in the ATM.

The interface 23 carries out traffic shaping to prevent the cell stream in the virtual path 3 from delivery into the physical link over an allocated capacity. In addition, the interface 23 provides a VC identification number when the new virtual channel 1 is set in the virtual path 3.

Figure 6B:
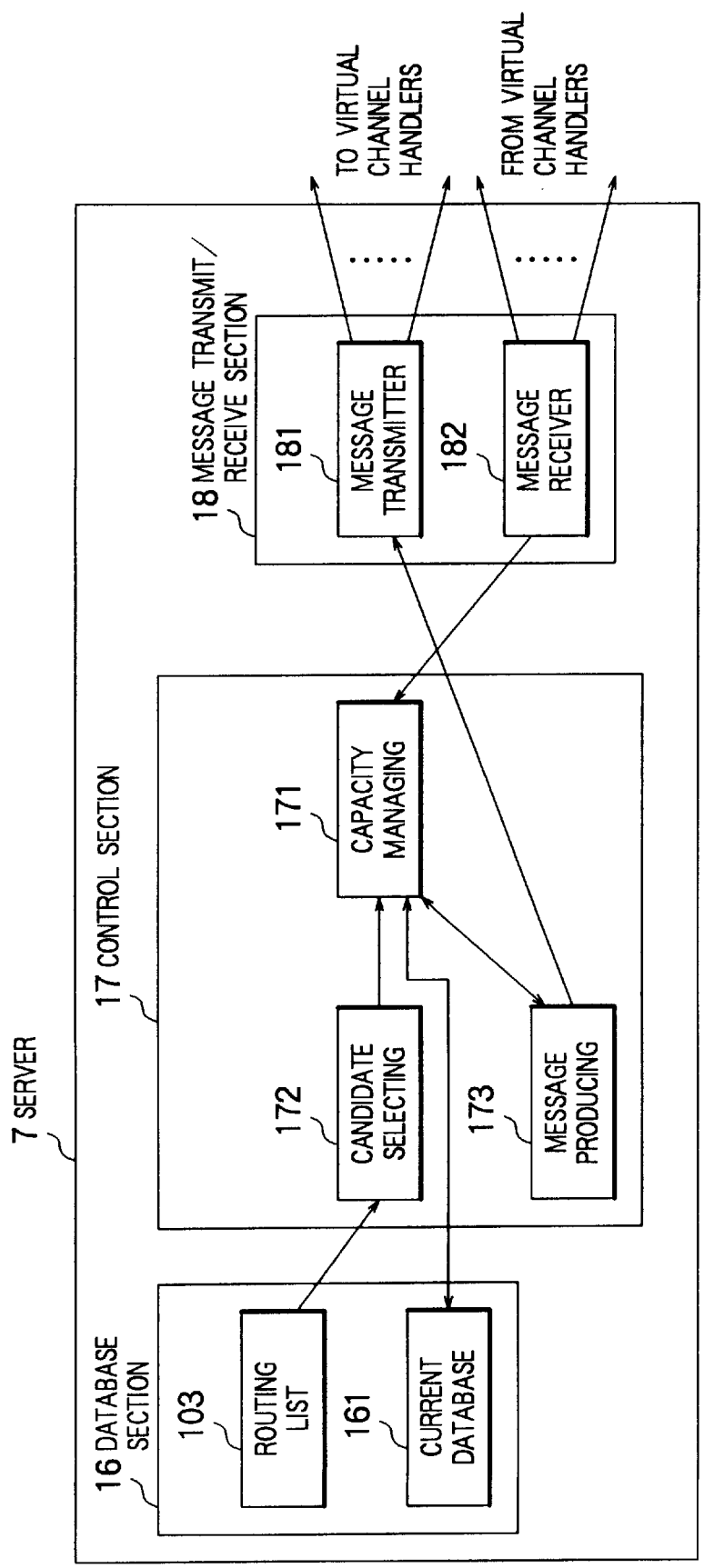

Referring to FIG. 6B, the reconstruction server 7 is responsive to a capacity increase request and selects the virtual channel handler 2 terminating a capacity decrease candidate virtual path, supplies a capacity decrease request to the virtual channel handler 2 thus selected, and, with reference to a capacity decrement informed from the virtual channel handler 2 terminating the virtual path 4 decreased in capacity, and notifies a possible capacity increment to the virtual channel handler 2 originating the capacity increase request.

The reconstruction server 7 comprises a database section 16, a control section 17, and a message transmit/receive section 18.

The database section 16 comprises a routing list database 103 and a current database 161.

Referring to FIG. 7A, control messages exchanged between the virtual channel handler 2 and the reconstruction server 7 include the expansion request message, the reduction request message, the reduction response message, and the expansion response message. As illustrated in the figure, each control message consists of one of expansion ("0") and reduction ("1") bits, one of request ("0") and response ("1") bits, one of reduction and expansion candidate VP numbers, and one of a requested expansion value, "don't care" (in case of the reduction request), a responded reduction value, and a responded expansion.

As illustrated in FIG. 7B, the current database 161 holds a table indicative of each physical link on the route of the virtual path involved in the expansion request, and idle capacity newly assured in the physical link 5 as a result of reduction for the reduction candidate virtual path passing therethrough. Specifically, the table comprises four entries including a terminating VCH number, a reduction candidate VP number, a physical link number, and the idle capacity.

As described in conjunction with the prior art, the physical link number is specified by a combination of a node number and a port number.

The current database 161 is cleared once the expansion value is determined.

The control section 17 comprises a capacity managing unit 171, a reduction candidate selecting unit 172, and a message producing unit 173.

With reference to the routing list database 103, the reduction candidate selecting unit 172 selects as the reduction candidate virtual path another virtual path accommodated in the same physical link accommodating the expansion candidate virtual path having the VP number specified in the expansion request message. For each reduction candidate virtual path, the reduction candidate selecting unit 172 extracts one of the node numbers of a pair of the virtual channel handlers 2 terminating the reduction candidate virtual path, for example, the one having a smaller value, and the physical link number of the physical link common to the expansion candidate virtual path.

The message producing unit 173 produces the reduction request message addressed to the virtual channel handler selected by the reduction candidate selecting unit 172 and the expansion response message addressed to the virtual channel handler 2 originating the expansion request.

By the use of the reduction candidate selecting unit 172 and the message producing unit 173, the capacity managing unit 171 carries out notification of the reduction request message to the virtual channel handler 2 terminating the reduction candidate virtual path and notification of the expansion response message to the virtual channel handler 2 originating the expansion request.

The message transmit/receive section 18 comprises a message transmitter 181 and a message receiver 182.

The message transmitter 181 delivers the reduction request message and the expansion response message prepared by the capacity managing unit 171 to the virtual channel handler 2 terminating the reduction candidate virtual path and the virtual channel handler 2 originating the expansion request, respectively.

The message receiver 182 delivers to the capacity managing unit 171 the reduction response message and the expansion request message supplied from the virtual channel handler 2 having transmitted the expansion request.

Next referring to FIGS. 8A and 8B, description will be made about the operation of the first embodiment.

At first referring to FIG. 8A, operation of the virtual channel handler 2 will be described.

In a step A1, the capacity managing unit 141 makes the performance managing unit 142 judge, with reference to the traffic database 101, whether or not the performance requirement is satisfied for a particular virtual path 3. If it is satisfied, the operation comes to an end.

If the performance requirement is not satisfied, the step A1 proceeds to a step A2. In the step A2, the capacity managing unit 141 makes the capacity calculating unit 113 calculate, as a newly calculated capacity, the required VP capacity for the particular virtual path 3 as the expansion candidate. The requested expansion value is obtained as a difference calculated by subtracting currently allocated capacity from the newly calculated capacity.

The step A2 is followed by a step B1 in which the capacity managing unit 141 makes the capacity setting unit 143 try expansion into the requested expansion value calculated in the step A2. If expansion is successful, the operation comes to an end.

If the expansion is unsuccessful, the step B1 proceeds to a step B2. In the step B2, the capacity managing unit 141 makes the message producing unit 144 produce the expansion request message for delivery to the message transmitter 151.

In a step B3, the capacity managing unit 141 receives a message from the message receiver 152. The step B3 is followed by a step B4 in which examination is carried out abut whether or not the received message is the expansion response message. If so, the step B4 proceeds to a step A8. Otherwise, the step B4 proceeds to a step B6.

In the step A8, examination is made about whether or not the expansion is possible, i.e., the responded expansion value in the message is not equal to zero. If not, the operation comes to an end.

If the responded expansion value is not equal to zero, i.e., the expansion is possible, the step A8 proceeds to a step B5. In the step B5, the capacity managing unit 141 makes the capacity setting unit 143 set a new capacity which is a sum of the current capacity and the responded expansion value.

On the other hand, in the step B6, the capacity managing unit 141 checks whether or not the message delivered from the message receiver 152 is the reduction request message. If not, the operation comes to an end.

If it is the reduction request message, the step B6 proceeds to a step A5. In the step A5, the capacity managing unit 141 makes the capacity calculating unit 113 calculate the new capacity for the reduction candidate virtual path 3 having the VP number specified in the message.

The step A5 is followed by a step A6 in which the capacity managing unit 141 examines whether or not the new capacity thus calculated is smaller than the current capacity so that the reduction is possible. If not, the step A6 proceeds to a step B8 in which the responded reduction value is set at zero.

If the reduction is possible, the step A6 proceeds to a step B7. In the step B7, the capacity managing unit 141 makes the connection control unit 143 reduce the VP capacity by the responded reduction value equal to a difference between the current capacity and the new capacity thus calculated. The step B7 is followed by a step B8.

In the step B8, the capacity managing unit 141 makes the message producing unit 144 produce a reduction response message for delivery to the message transmitter 151.

Figure 8B:
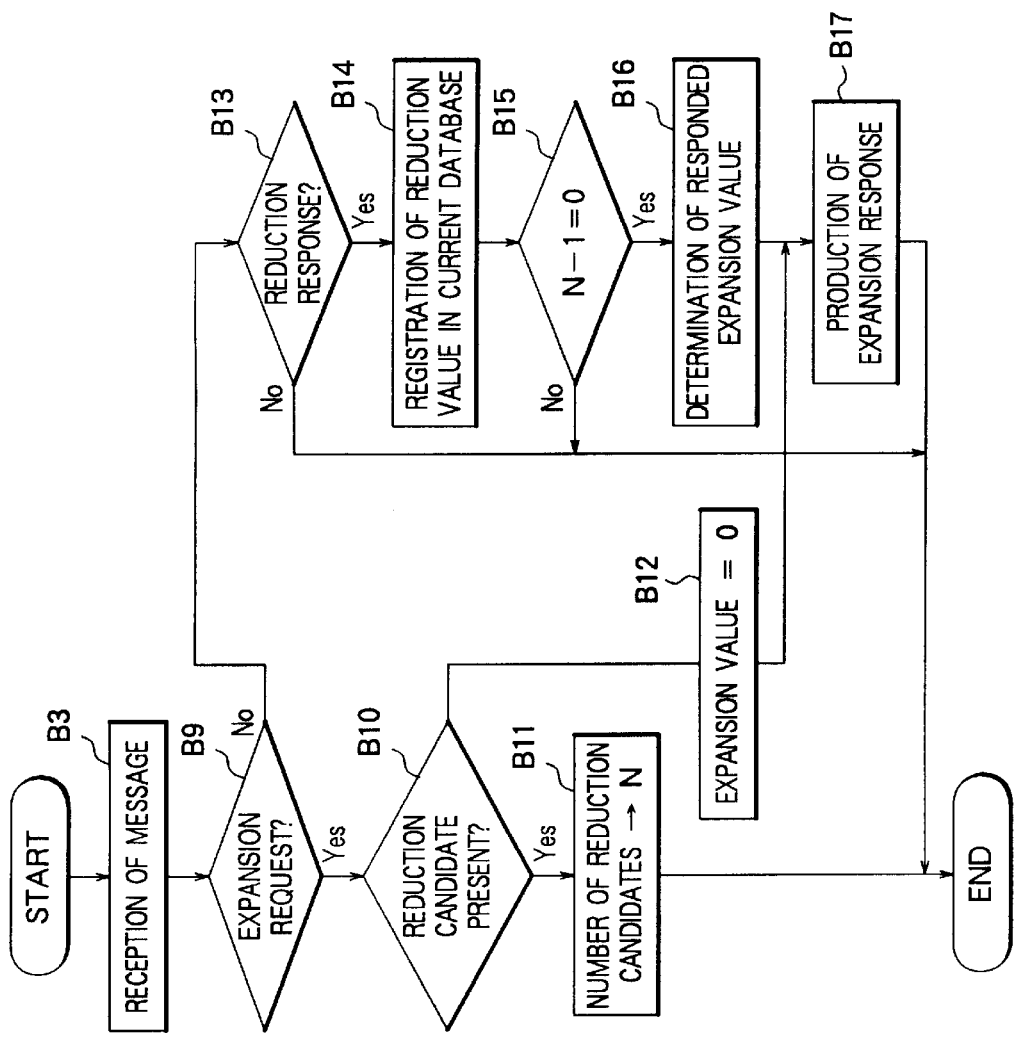

Turning to FIG. 8B, operation of the reconstruction server 7 will be described.

In a step B3, the capacity managing unit 171 is supplied with the message from the message receiver 182. The step B3 is followed by a step B9 in which examination is made about whether or not the message is the expansion request message. If so, the step B9 proceeds to a step B10. Otherwise, the step B9 proceeds to a step B13.

In the step B10, the capacity managing unit 171 makes the reduction candidate selecting unit 172 select as the reduction candidate virtual path another virtual path 3 passing the same physical link as the expansion candidate virtual path 3 having the VP number specified in the expansion request message. The VP number of the reduction candidate virtual path, a smaller one of the node numbers of the virtual channel handlers 2 terminating the reduction candidate virtual path, and the physical link number of the physical link common to the expansion candidate virtual path are extracted and recorded in the current database 161.

Then, the capacity managing unit 171 makes the message producing unit 173 select the reduction candidate virtual path and the virtual channel handler 2 terminating the reduction candidate virtual path. Examination is made about presence or absence of the reduction candidate.

In case of absence of the reduction candidate, the step B10 proceeds to a step B12 in which the expansion value is set at zero. The step B12 is followed by a step B17.

If at least one of the reduction candidate virtual path is selected, the step B10 proceeds to a step B1. In the step B11, the reduction request message addressed to the virtual channel handler 2 which terminates the reduction candidate virtual path 3 and whose node number is extracted in the step B10 is produced and delivered to the message transmitter 181. In addition, the number of the reduction candidate virtual paths for the expansion candidate virtual path is set to a response variable N.

In the step B13, the capacity managing unit 171 checks whether or not the message supplied from the message receiver 182 is the reduction response message. If not, the operation comes to an end.

If the message supplied from the message receiver 182 is the reduction response message, the step B13 proceeds to a step B14. In the step B14, the capacity managing unit 171 makes the current database 161 set the responded reduction value as the idle capacity for all physical link numbers corresponding to the same reduction candidate VP number specified in the reduction message.

The step B14 is followed by a step B15 in which the unity is subtracted from the response variable N representative of the number of the virtual paths delivering the reduction response. Judgement is made about whether or not the subtraction result is equal to zero. If it is not equal to zero, the operation comes to an end because the response is not returned from all virtual paths to which the reduction request is delivered.

If the subtraction result obtained by subtracting the unity from the response variable N is equal to zero, the response is returned from all virtual paths to which the reduction request is delivered. In this event, the step B15 proceeds to a step B16. In the step B16, the capacity managing unit 171 refers to the current database 161 and calculates as an allowable expansion value the total idle capacity for each physical link number. A smaller one of the allowable expansion value and the required expansion value specified in the expansion request message is selected as a responded expansion value. In addition, the current database 161 is cleared.

The step B16 is followed by a step B17 in which the capacity managing unit 171 makes the message producing unit 173 produce the expansion response message addressed to the virtual channel handler 2 having transmitted the expansion request message. The expansion response message is delivered to the message transmitter 181.

In the first embodiment of this invention, performance management of the virtual path 3 and calculation of the required capacity are carried out by the virtual channel handler 2 terminating the virtual path 3. Expansion and reduction of the capacity are carried out by the use of signalling activated by the virtual channel handler 2 terminating the virtual path in consideration. Thus, it is possible to shorten the time required in reconstruction of the network.

Now, operation of the first embodiment will be described in detail.

Referring to FIGS. 5, 6A and 6B in addition to FIGS. 8A and 8B, the capacity managing unit 141 in the virtual channel handler 2-1 makes the performance managing unit 142 examine whether or not the performance requirement is satisfied (step A1). Since the performance requirement is not satisfied, the capacity managing unit 141 makes the capacity setting unit 143 try expansion in capacity of the virtual path 3-1. However, the trial has failed. Therefore, the expansion request message is produced with the virtual path 3-1 as the expansion candidate virtual path and is delivered to the message transmitter 151 (step B2). The expansion request message is transmitted to the reconstruction server 7.

Supplied with the expansion request message from the message receiver 182, the capacity managing unit 171 in the reconstruction server 7 makes the reduction candidate selecting unit 172 extract other virtual paths 3-2 and 3-3 sharing the physical links 5-1 and 5-2 with the virtual path 3-1 specified in the message as the expansion candidate virtual path. Furthermore, the virtual channel handlers 2-2 and 2-4 are selected each of which has a smaller node number in a pair of the virtual channel handlers 2 terminating each of the virtual paths 3-2 and 3-3 (step B10).

Next, the capacity managing unit 171 produces the reduction request messages addressed to the virtual channel handlers 2-2 and 2-4 with the virtual paths 3-2 and 3-3 as the reduction candidates, respectively, and delivers the reduction request messages to the message transmitter 181 (step B11). The reduction request messages are transmitted to the virtual channel handlers 2-2 and 2-4.

When the virtual channel handler 2-2 is supplied with the reduction request message from the message receiver 152, the capacity managing unit 141 makes the capacity calculating unit 113 calculate the new capacity for the virtual path 3-2 specified in the message (step A5).

Then, since the reduction is possible from the current capacity, the capacity managing unit 141 makes the capacity setting unit 143 reduce the capacity of the virtual path 3-2 (step B7). Subsequently, the capacity managing unit 141 makes the message producing unit 144 produce the reduction response message carrying the indication of the virtual path 3-2 subjected to reduction and the reduction value. The reduction response message is delivered to the message transmitter 151 (step B8).

Likewise, the virtual channel handler 2-4 carries out the above-mentioned steps A5, B7, and B8.

In the reconstruction server 7, when all the reduction response messages with respect to the expansion candidate virtual path 3-1 are returned, the capacity managing unit 171 makes the message producing unit 173 produce the expansion response message with a smaller one of the reduction values of the virtual paths 2-2 and 2-3 selected as the expansion value. The expansion response message is delivered to the message transmitter 181 (step B17). The expansion response message is transmitted to the virtual channel handler 2-1.

In the virtual channel handler 2-1, the capacity managing unit 141 is supplied with the expansion response message from the message receiver 152 and looks into the expansion response message. Since an expandable value is not equal to zero, i.e., expansion is possible, the capacity managing unit 141 makes the capacity setting unit 143 execute expansion of the virtual path 3-1 (step B5).

Figure 9:
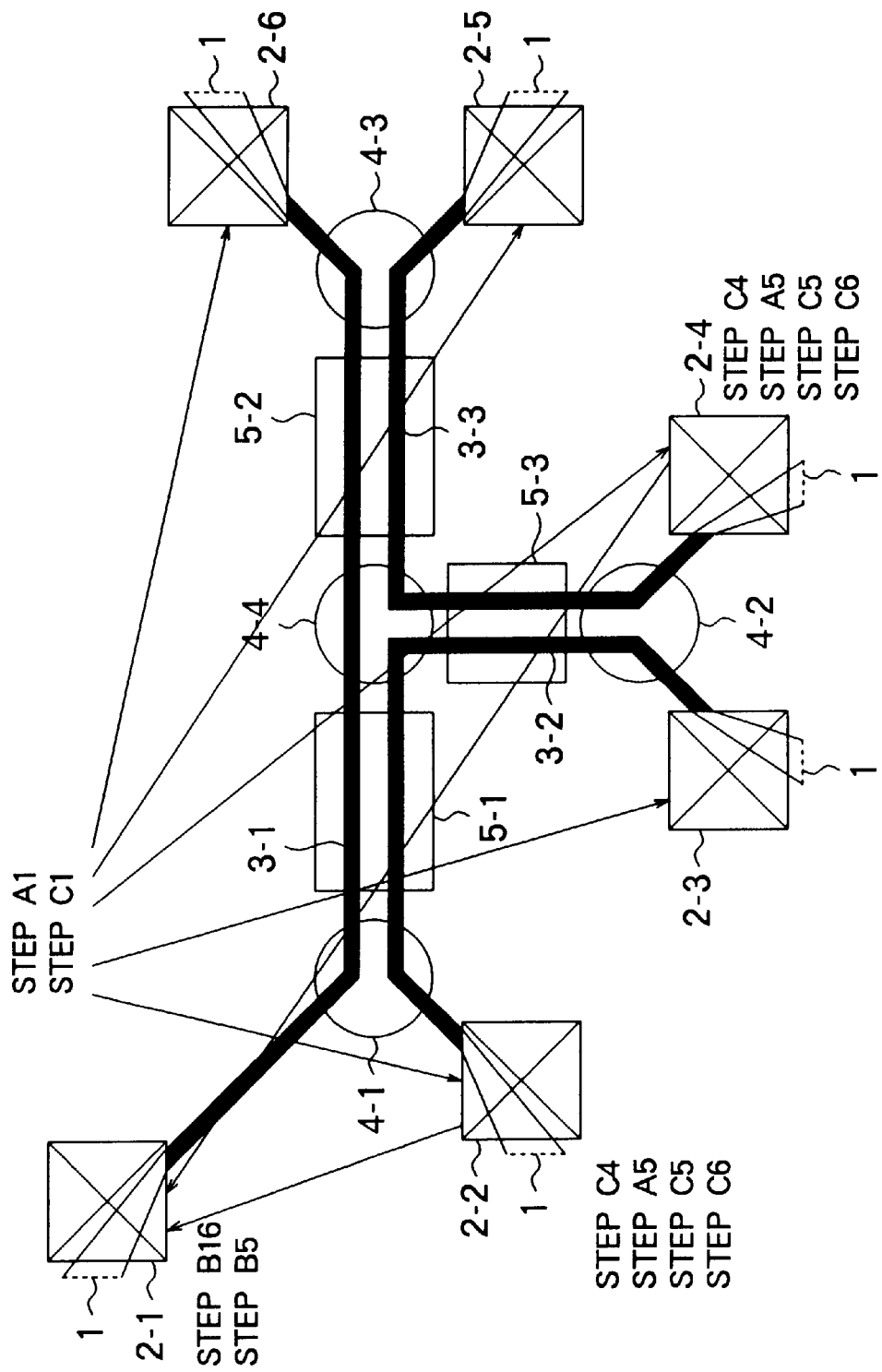
FIG. 9 is a schematic block diagram for describing the structure and the operation of a network according to a second embodiment of this invention.

Referring to FIG. 9, a network according to a second embodiment of this invention comprises virtual channels 1, virtual channel handlers 2, virtual paths 3, virtual path handlers 4, and physical links 5. Each of the virtual path handlers and the virtual channel handlers is assigned with a node number.

The second embodiment is different from the first embodiment in that no reconstruction server 7 is provided. If necessary, the virtual channel handler 2 produces the reduction request/response messages including the requested reduction value or the responded reduction value for the capacity of the virtual path terminated by the virtual channel handler 2, and the routing list. The messages are directly exchanged between the virtual channel handler 2 in consideration and all other virtual channel handlers. To this end, all of the virtual channel handlers 2 within the network have private communication paths for exchanging the reduction request/response messages.

Figure 10A:
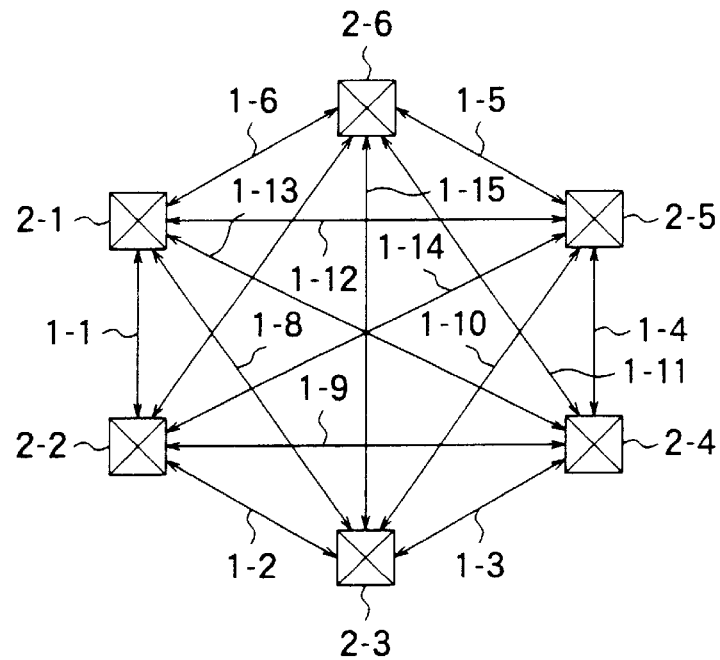
FIGS. 10A and 10B are block diagrams showing the state of connection between virtual channel handlers in FIG. 9.
Figure 10B:
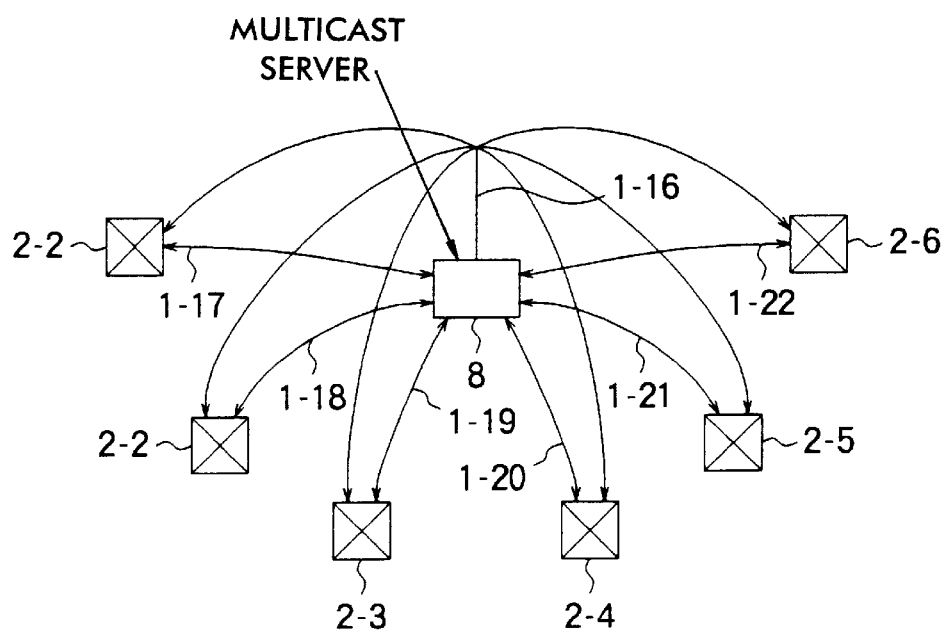

Referring to FIGS. 10A and 10B, the communication paths connecting the virtual channel handlers 2 will be described.

At first referring to FIG. 10A, the virtual channel handlers 2-1 through 2-6 are connected to one another through one-to-one private virtual channels 1-1 through 1-6. The reduction request messages are individually transmitted to the other virtual channel handlers through the one-to-one private virtual channels, respectively.

When the reduction response message is returned to the virtual channel handler 2 having delivered the reduction request message, a one-to-multi private virtual channel to transmit is selected with reference to the node number contained at an upper digit of the VP number of the reduction candidate virtual path to respond. Through the one-to-multi private virtual channel thus selected, the reduction response message is transmitted to the virtual channel handler 2 having notified the reduction request message.

Turning to FIG. 10B, the virtual channel handlers 2-1 through 2-6 are connected to a multicast server 8 through one-to-one private virtual channels 1-17 through 1-22. The multicast server 8 is connected through a one-to-multi private virtual channel 1-16 to all of the virtual channel handlers 2-1 through 2-6. When the reduction request message is received from a particular virtual channel handler through the one-to-one private virtual channel, the multicast server 8 multicasts the message to all of the virtual channel handlers through the virtual channel 1-16. When the reduction response message is received from a particular virtual channel handler through the one-to-one private virtual channel, the multicast server 8 transfers the message through the one-to-one private virtual channel to the virtual channel handler having produced the reduction request. For example, the one-to-one private virtual channel to transmit is selected with reference to the node number contained at an upper digit of the reduction candidate VP number in the reduction response message. Through the one-to-one private virtual channel, the reduction response message is transmitted to the virtual channel handler 2 having notified the reduction request message.

The number of the physical link 5 on the route of each virtual path 3 terminated by the virtual channel handler 2 is notified by a signalling message to the virtual channel handlers 2 terminating the both ends of the virtual path 3 when the virtual path 3 is initialized by signalling. Alternatively, the number is notified from the network managing system or the like.

Referring to FIG. 11A, the messages exchanged among the virtual channel handlers have the formats illustrated in the figure. Specifically, the reduction request message comprises a reduction request bit ("0"), an expansion candidate VP number, a requested reduction value ("don't care"), a hop number, and physical link numbers as the routing list. Herein, the hop number is equal to the number of the physical link numbers specified in the message. On the other hand, the reduction response message comprises a reduction response bit ("1"), a responded reduction value, the number of common physical link numbers, and the physical link numbers common to the expansion candidate virtual path.

Figure 12:
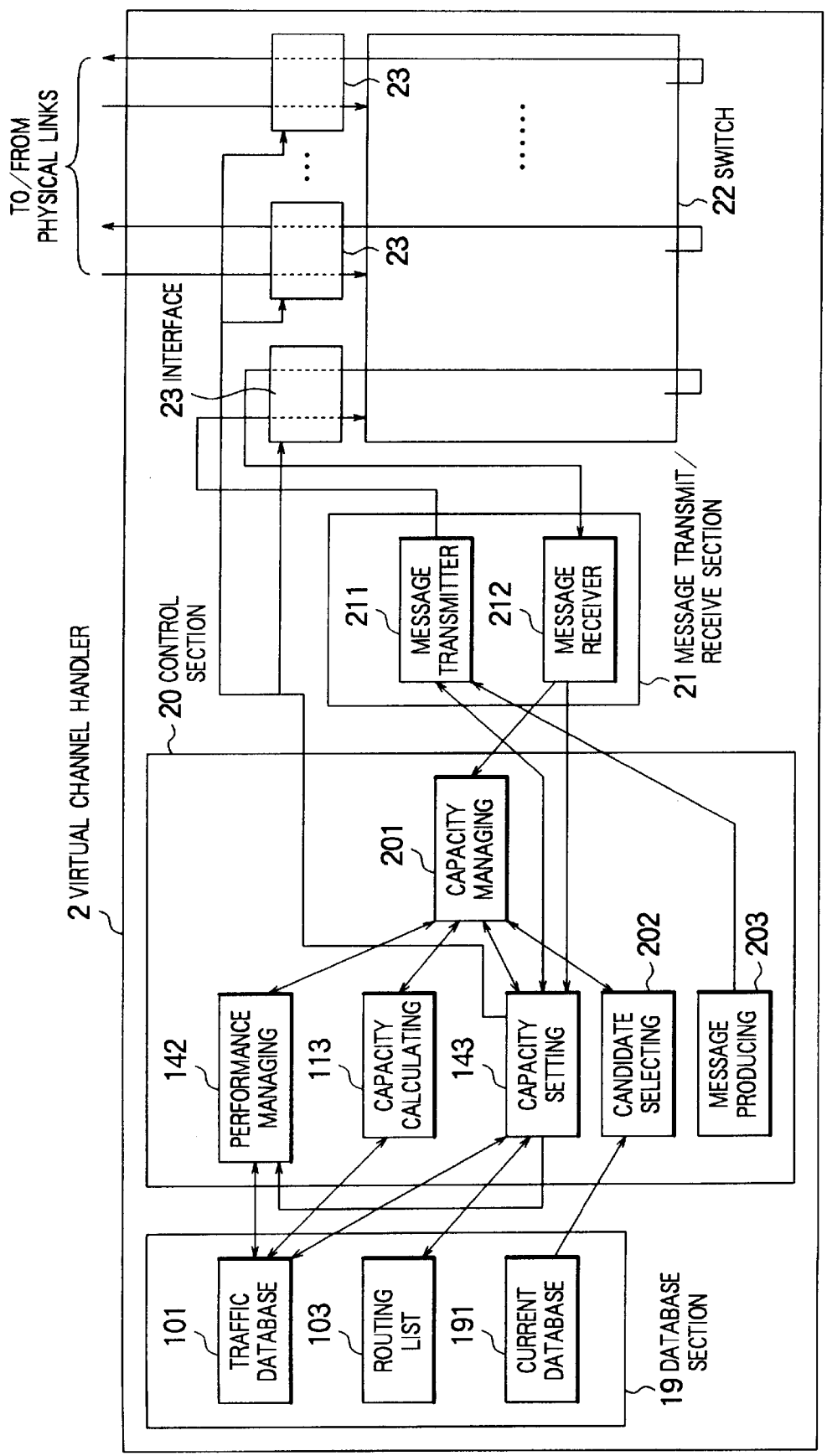
FIG. 12 is a block diagram of the virtual channel handler illustrated in FIG. 9.

Referring to FIG. 12, the virtual channel handler 2 in the second embodiment comprises a database section 19, a control section 20, a message transmit/receive section 21, and an internal interface 22.

The database section 19 comprises a traffic database 101, a routing list database 103, and a current database 191.

As illustrated in FIG. 11B, the current database 191 comprises a table having entries representative of the physical link number and the capacity. When the expansion value is determined, the table is cleared.

The control section 20 comprises a capacity calculating unit 113, a performance managing unit 142, a capacity setting unit 143, a capacity managing unit 201, a reduction candidate selecting unit 202, and a message producing unit 203.

With reference to the routing list database 103, the reduction candidate selecting unit 202 selects, as the reduction candidate virtual path, any other virtual path 3 passing the same physical link 5 as the expansion candidate virtual path having the number specified in the reduction request message, and extracts the VP number of the reduction candidate virtual path and the physical link number.

The message producing unit 203 produces the reduction request message containing the requested expansion value and the routing list comprising a set of the physical link numbers of the physical links on the route of the expansion candidate virtual path, and the reduction response message including the responded reduction value and a set of the physical link numbers of the physical links common to the expansion and the reduction candidate virtual paths. These messages are delivered to the message transmitter 211.

The capacity managing unit 201 judges the necessity of expansion and reduction of the VP capacity and sets the VP capacity by the use of the performance managing unit 142, the capacity calculating unit 113, the capacity setting unit 143, the reduction candidate selecting unit 202, and the message producing unit 203.

The message transmit/receive section 21 comprises a message transmitter 211 and a message receiver 212. Both of the message transmitter 211 and the message receiver 212 can internally return the reduction request message addressed to the virtual channel handler in consideration.

The message transmitter 211 transmits to an adjacent virtual path handler 4 a signalling message produced by the capacity setting unit 143. The message transmitter 211 transmits to all other virtual channel handlers 2 the reduction request message produced by the message producing unit 203. The message transmitter 211 transmits the reduction response message to the virtual channel handler 2 having produced the reduction request.

The message receiver 212 delivers to the capacity setting unit 143 the signalling message received from the adjacent virtual path handler 4. The message receiver 212 delivers to the capacity managing unit 201 the reduction request message or the reduction response message received from the other virtual channel handler 2.

Now referring to FIG. 13, the operation of the virtual channel handler 2 will be described.

Figure 13:
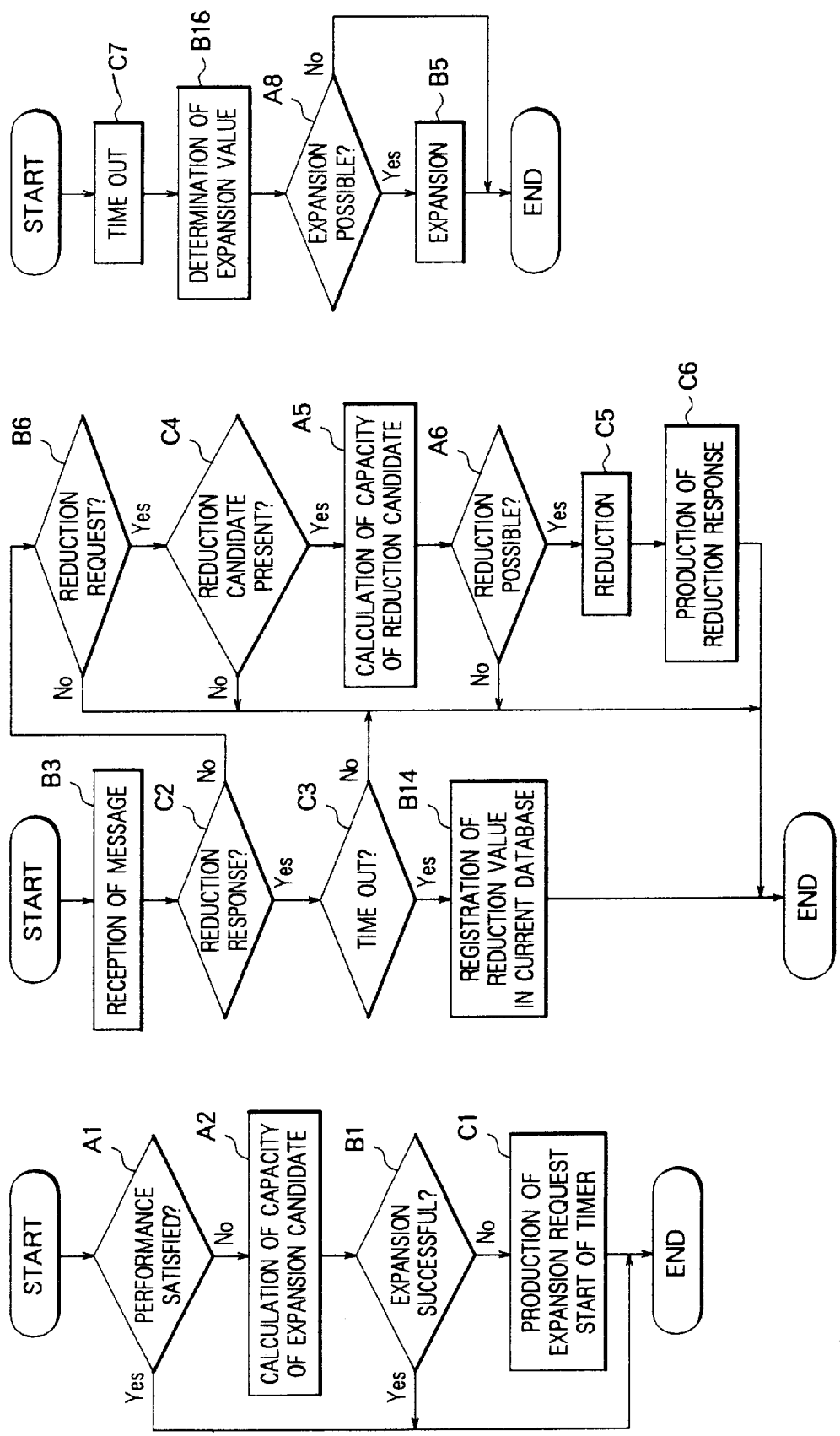
FIG. 13 is a flow chart for describing the operation of the virtual channel handler illustrated in FIG. 9.

Referring to FIG. 13, in a step A1, the capacity managing unit 201 makes the performance managing unit 142 judge, with reference to the traffic database 101, whether or not the performance requirement is satisfied for a particular virtual path 3. If it is satisfied, the operation comes to an end.

If the performance requirement is not satisfied, the step A1 proceeds to a step A2. In the step A2, the capacity managing unit 201 makes the capacity calculating unit 113 calculate, as newly calculated capacity, the required VP capacity for the particular virtual path 3 as the expansion candidate. The expansion request value is obtained as a difference calculated by subtracting currently allocated capacity from the newly calculated capacity.

The step A2 is followed by a step B1 in which the capacity managing unit 201 makes the capacity setting unit 143 try expansion into the requested expansion value calculated in the step A2. If expansion is successful, the operation comes to an end after renewing the VP capacity in the traffic database 101.

If the expansion is unsuccessful, the step B1 proceeds to a step C1. In the step C1, the capacity managing unit 201 makes the message producing unit 203 produce the expansion request message for delivery to the message transmitter 211. In addition, a timer is started with respect to the expansion candidate virtual path.

Referring to FIG. 13, in a step B3, the capacity managing unit 201 receives a message from the message receiver 211. The step B3 is followed by a step C2 in which examination is carried out about whether or not the received message is the reduction response message. If so, the step C2 proceeds to a step C3. Otherwise, the step C2 proceeds to a step B6.

In the step C3, the capacity managing unit 201 examines whether or not the time is out with respect to the expansion candidate virtual path 3. If so, the operation comes to an end.

If the time is not out, the step C3 proceeds to a step B14. In the step B14, a set of the physical link number and the capacity in the reduction response message is registered in the current database 191. Then, the operation comes to an end.

In the step B6, the capacity managing unit 201 checks whether or not the message is the reduction request message. If not, the operation comes to an end.

In case of the reduction request message, the step B6 proceeds to a step C4. In the step C4, the capacity managing unit 201 makes the reduction candidate selecting unit 202 examine whether or not any virtual path 3 shares the same physical link with the expansion candidate virtual path having the VP number specified in the message. If none is found, the operation comes to an end.

If there is any virtual path passing the same physical link as the expansion candidate virtual path, all such virtual paths are extracted as the reduction candidate virtual paths. The step C4 proceeds to a step A5. In the step A5, the capacity calculating unit 113 calculates the required VP capacity for each reduction candidate virtual path.

The step A5 is followed by a step A6 in which judgement is made about whether or not any of the reduction candidate virtual paths is reducible because the required VP capacity thus calculated is smaller than the current capacity. If none is found, the operation comes to an end.

If there is any reducible virtual path or paths, the step A6 proceeds to a step C5. In the step C5, a responded reduction value is calculated as a difference between the current capacity and the required VP capacity newly calculated. If the node number is smaller than the virtual channel handler terminating the other end of each virtual path, the capacity managing unit 201 makes the capacity setting unit 143 reduce the VP capacity of the reducible virtual path or paths 3 by the amount corresponding to the responded reduction value.

The step C5 is followed by a step C6. In the step C6, the capacity managing unit 201 makes the message producing unit 203 produce the reduction response message which is addressed to the virtual channel handler 2 producing the reduction request and which includes the routing list of the expansion candidate virtual path, a set of the physical link numbers common to those of the routing list in the reduction request message, and the responded reduction value. The reduction response message is delivered to the message transmitter 211.

Referring to FIG. 13, it is monitored in a step C7 that the time is out for the expansion candidate virtual path 3. When the time is out, the step C7 proceeds to a step B16. In the step B16, the capacity managing unit 201 refers to the current database 191 and calculates the total capacity for each physical link to obtain the maximum total capacity as an allowable expansion value. A smaller one of the requested expansion value calculated in the step A2 and the allowable expansion value is selected as the expandable value.

The step B16 is followed by a step A8 in which judgement is made about whether or not the expandable value is equal to zero. If it is equal to zero, the operation comes to an end because the expansion is impossible.

If the expandable value is not equal to zero, the step A8 proceeds to a step B5 because the expansion is possible. In the step B5, the capacity managing unit 201 makes the capacity setting unit 143 set the new capacity which is equal to a sum of the expandable value and the current capacity.

In the second embodiment of this invention, each virtual channel handler 2 carries out selection of the reduction candidate virtual paths in addition to performance management of the virtual path, calculation of the required capacity, and the expansion and the reduction of the capacity. Therefore, the time required in reconstruction is further reduced. In addition, all of a series of the steps required in reconstruction of the network are carried out in a parallel and distributed manner so that the reliability is improved as compared with the reconstruction carried out in a concentrated fashion.

Since the multicast server 8 is used to transfer the reduction request messages to all of the virtual channel handlers 2, the number of the required virtual channels is reduced as compared with the case where the one-to-one private virtual channels are individually defined among the virtual channel handlers 2. Specifically, the number is proportional to the number of the virtual channel handlers while in the latter case the number is equal to the square of the number of the virtual channel handlers. When a new virtual channel handler 2 is added, it is not necessary to define individual one-to-one private virtual channels connected to all other virtual channel handlers. It is sufficient to establish two virtual channels, i.e., one-to-one and one-to-multi virtual channels connected to the multicast server 8. Therefore, expandability and flexibility of the reconstructible network are improved.

Furthermore, in order to transfer the reduction request message to all other virtual channel handlers 2, it is not necessary to individually transfer the message to the respective private virtual channels 1-1 to 1-15. It is sufficient to transfer the message to the multicast server 8. Thus, transfer of the reduction request message can be quickly carried out. In addition, by managing the connection between the virtual channel handlers 2 and the multicast server 8, it is possible to manage new subscription/withdrawal of the virtual channel handler to a group of those virtual channel handlers 2 sharing the bandwidths with each other.

Referring to FIG. 9 in addition to FIGS. 12 and 13, description will be made in detail as regards the operation of the second embodiment of this invention. Referring to FIG. 9, the capacity managing unit 201 in the virtual channel handler 2-1 makes the performance managing unit 142 examine whether or not the performance requirement is satisfied (step A1). Since it is not satisfied, the capacity managing unit 201 makes the capacity setting unit 143 try expansion of the capacity of the virtual path 3-1. This trial has failed. Then, the capacity managing unit 201 makes the message producing unit 203 produce the reduction request message including the routing list (virtual channel handler 2-1, virtual path handlers 4-1, 4-4, 4-3, virtual channel handler 2-6) for the virtual path 3-1 as the expansion candidate. The reduction request message is delivered to the message transmitter 211 (step C1) for transmission to all other virtual channel handlers 2-2 through 2-6.

In the virtual channel handler 2-3, the capacity managing unit 201 receives from the message receiver 212 the reduction request message transmitted from the virtual channel handler 2-1 and makes the reduction candidate selecting unit 202 search the reduction candidate virtual path to find the virtual path 3-2 passing through the same physical link 5-1 as the expansion candidate virtual path 3-1 specified in the message (step C4). Then, the capacity managing unit 201 makes the capacity calculating unit 113 calculate the required capacity of the virtual path 3-2 (step A5).

From the required capacity of the virtual path 3-2 thus calculated and the current VP capacity, the capacity managing unit 201 judges that the reduction is possible. In addition, the node number is smaller than that of the other virtual channel handler 2-3 terminating the other end of the virtual path 3-2. Therefore, the capacity managing unit 201 makes the capacity setting unit 143 reduce the VP capacity by signalling (step C5). The message producing unit 203 produces the reduction response message including the reduction value and the indication of the common physical link 5-1. The reduction response message is delivered to the message transmitter 211 (step C6) for transmission to the virtual channel handler 2-1.

The steps similar to the steps C4, A5, B7, and C5 are also carried out in the virtual channel handler 2-4. As a result, the virtual channel 3-2 is reduced and the reduction response message including the reduction value and the indication of the common physical link 5-2 is transmitted to the virtual channel handler 2-1.

In the virtual channel handler 2-1 originating the reduction request, the capacity managing unit 201 is supplied from the message receiver 212 with the reduction response message from the virtual channel handler 2-2 and looks at the reduction value in the message to register the idle capacity in the current database 191 for the physical link 5-1. Likewise, supplied with the reduction request message from the virtual channel handler 2-4, the idle capacity is registered for the physical link 5-2.

When the time is out, the capacity managing unit 201 refers to the current database 191 and selects as an expansion value a smaller one of the idle capacities of the physical links 5-1 and 5-2 (step B15). By the use of the capacity setting unit 143, expansion is carried out (step B5).

According to this invention, it is possible to reduce the time required in reconstruction of the network, specifically, the time from judgement of necessity of the expansion in capacity for particular virtual connection to completion of the expansion by releasing the unused part from the virtual connection having spare capacity. It is therefore possible to assure the performance in each virtual connection following rapid variation in traffic.

This is because determination of the virtual connection to be expanded in capacity and calculation of the required capacity are carried out by the communication node terminating the virtual connection, and modification of the capacity is executed by signalling activated by the communication node terminating the virtual connection. Thus, the calculation of the capacity and the expansion of the capacity required in reconstruction of the network are executed in each communication node terminating and relaying the virtual connection in a distributed and parallel fashion. This brings about the distributed arrangement of the information required to be searched and renewed.

According to this invention, it is also possible to further reduce the time required in reconstruction of the network and to improve the reliability in reconstruction of the network.

This is because the selection of the virtual connection to be reduced in capacity can also be carried out by the communication node terminating the virtual connection. Thus, all of a series of steps required in reconstruction of the network are executed in a distributed and parallel fashion. This brings about the distributed arrangement of the information to be searched and renewed. As a result, no such device or function is required that carries out concentrated operation over the whole network.

What is claimed is:

1. A communication node comprising:
    a performance manager which terminates or relays a virtual connection and which monitors information relating to traffic and performance of said virtual connection to determine the necessity of expansion in capacity of said virtual connection;
    a capacity calculating circuit which calculates a capacity to be allocated to said virtual connection with reference to said information relating to said traffic;
    a message transmitter which produces an expansion request message including a requested expansion value and information specifying said virtual connection when it is determined that said virtual connection requires the expansion in capacity, and said message transmitter produces a reduction response message including a responded reduction value and information specifying a particular virtual connection which is available to be reduced in capacity;
    a message receiver which receives said expansion request message and said reduction response message; and
    a capacity managing circuit which expands or reduces said capacity of said virtual connection in response to said expansion request message and said reduction response message.

2. A reconstruction server comprising:
    a database having information relating to physical links on a route of a virtual connection and information relating to at least one communication node terminating said virtual connection;
    a selector which selects, with reference to said database, another virtual connection accommodated in a same physical link as a particular virtual connection, said particular virtual connection being determined as requiring an expansion in capacity, and selects another communication node terminating said another virtual connection; and
    a message transmitter which produces a reduction request message including information to notify said another virtual connection and said another communication node of a reduction in capacity of said another virtual connection, and which produces an expansion response message including a responded expansion value and information specifying the particular virtual connection involved in an expansion request received from said particular virtual connection;
    said responded expansion value being determined with reference to a responded reduction value contained in a reduction response message received by said server from said another virtual connection and a requested expansion value contained in an expansion request message received by said server from said particular virtual connection.

3. A reconstructible network comprising:
    a plurality of communication nodes, each comprising:
        a performance manager which terminates or relays a virtual connection and which monitors information relating to traffic and performance of said virtual connection to determine the necessity of expansion in capacity of said virtual connection;
        a capacity calculating circuit which calculates a capacity to be allocated to said virtual connection with reference to said information relating to said traffic;
        a message transmitter which produces an expansion request message including a requested expansion value and information specifying a particular virtual connection when it is determined that said particular virtual connection requires an expansion in capacity, and said message transmitter produces a reduction response message including a responded reduction value and information specifying another virtual connection which is available to be reduced in capacity;
        a message receiver which receives said expansion request message and said reduction request message; and
        a capacity managing circuit which expands or reduces said capacity of said virtual connection in response to said expansion request message and said reduction response message; and
    at least one reconstruction server comprising:
        a database having information relating to physical links on a route of said virtual connection and information relating to at least one communication node terminating said virtual connection;
        a selector which selects, with reference to said database, another virtual connection accommodated in a same physical link as a particular virtual connection and selects another communication node terminating said another virtual connection; and
        a message transmitter which produces a reduction request message including information to notify said another virtual connection and said another communication node of a reduction in capacity of said another virtual connection, and which produces an expansion response message including a responded expansion value and information specifying said particular virtual connection involved in said expansion request message;
        said responded expansion value being determined with reference to a responded reduction value contained in said reduction response message received by said server from said another virtual connection and a requested expansion value contained in said expansion request message received by said server from said particular virtual connection;
    each of said communication nodes transmitting said expansion request message and said reduction response message to said at least one reconstruction server, a communication path being defined between each communication node and said at least one reconstruction server so that said reduction request message and said expansion request message can be received by each communication node from said reconstruction server.

4. A method of reconstructing a network comprising a plurality of communication nodes each terminating or relaying a virtual connection, at least one reconstruction server, and a communication path established between said reconstruction server and each communication node, wherein:

each of said communication nodes performs the steps of:
monitoring traffic and performance information for a virtual connection terminated by each said communication node to determine the necessity of an expansion in capacity of a particular virtual connection terminated by a particular communication node;
calculating, upon determining the necessity of a capacity expansion by said particular virtual connection, a first new capacity to be allocated to said particular virtual connection with reference to said traffic information and to determine a requested expansion value with reference to said first new capacity and a currently allocated capacity; and
sending said reconstruction server an expansion request message including information specifying said particular virtual connection requiring expansion and said requested expansion value;

said reconstruction server:
receiving said expansion request message;
selecting, among said virtual connections within said network and those communication nodes terminating said virtual connections, other virtual connections each passing a same physical link as said particular virtual connection, and other communication nodes terminating said other virtual connections;
sending said other communication nodes thus selected, a reduction request message including information specifying said other virtual connections thus selected;

each of said other communication nodes:
receiving said reduction request message; and
calculating, with reference to said traffic information, a second new capacity to be allocated to a respective other virtual connection specified by said reduction request message;
reducing the capacity of a respective other virtual connection when reduction to said second new capacity of said respective other connection thus calculated is possible; and
sending said reconstruction server a reduction response message including information specifying said other virtual connection subjected to reduction and a responded reduction value;

said reconstruction server:
determining, with reference to the responded reduction value contained in each of said reduction response messages received from said other communication nodes receiving said reduction request and with reference to said requested expansion value contained in said expansion request message, a responded expansion value for said particular virtual connection specified by said expansion request; and
sending to said particular communication node having requested said expansion request, an expansion response message including information specifying said particular virtual connection specified by said expansion request and said responded expansion value;

wherein said particular communication node originating said expansion request carries out the expansion in capacity of said particular virtual connection requiring expansion, with reference to said responded expansion value contained in said expansion response message.

5. A communication node comprising:
a performance manager which terminates or relays a virtual connection and which collects information relating to traffic and performance of said virtual connection to determine the necessity of expansion in capacity of said virtual connection;
a capacity calculating circuit which calculates a capacity to be allocated to said virtual connection with reference to said information relating to said traffic;
a transmitter which produces a reduction request message including information specifying said virtual connection when it is determined that said virtual connection requires a capacity expansion and each physical link passed by said virtual connection, and produces a reduction response message indicating a responded capacity reduction value;
a receiver which receives said reduction request message and said reduction response message;
a capacity managing circuit which expands or reduces said capacity of said virtual connection in response to said reduction request message and said reduction response message; and
a selector which selects, among all virtual connections terminated by said communication node, other virtual connections each accommodated in a same physical link as each physical link specified in said reduction response message;
wherein said communication node determines a capacity expandible value for said virtual connection determined as requiring expansion, said capacity expandible value being determined with reference to said responded capacity reduction value and said reduction request message.

6. The node as claimed in claim 5, further comprising a port which establishes communication paths which convey said reduction request message and said reduction response message between said communication node and another communication node.

7. A reconstructible network, comprising:
a plurality of nodes each including:
a performance manager which terminates or relays a virtual connection and which collects information relating to traffic and performance of said virtual connection to determine the necessity of expansion in capacity of said virtual connection;
a capacity calculating circuit which calculates a capacity to be allocated to said virtual connection with reference to said information relating to said traffic;
a transmitter which produces a reduction request message including information specifying said virtual connection when it is determined that said virtual connection requires a capacity expansion and each physical link passed by said virtual connection, and produces a reduction response message indicating a responded capacity reduction value;
a receiver which receives said reduction request message and said reduction response message;
a capacity managing circuit which expands or reduces said capacity of said virtual connection in response to said reduction request message and said reduction response message; and
a selector which selects, among all virtual connections terminated by said communication node, other virtual connections each accommodated in a same physical link as each physical link specified in said reduction response message;
wherein said communication node determines a capacity expandible value for said virtual connection determined as requiring expansion, said capacity expandible value being determined with reference to said responded capacity reduction value and said reduction request message; and a plurality of communication paths which convey said reduction request message and said reduction response message between said communication node and another communication node;

wherein each of said communication nodes is coupled to a multicast server having one-to-multi virtual connection to all communication nodes terminating virtual connections, said multicast server conveys said reduction request message to all communication nodes terminating the virtual connections.

8. A method of reconstructing a network comprising a plurality of communication nodes relaying or terminating virtual connections, wherein each of said communication nodes performs the acts of:
collecting traffic and performance information of a virtual connection terminated by each respective communication node to determine the necessity of an expansion in capacity of said virtual connection for a particular virtual connection terminated in a particular node;

calculating, upon judging the necessity of said expansion in capacity, a first new capacity to be allocated to said particular virtual connection with reference to said traffic information, said calculating thereby determines a requested expansion value with reference to said first new capacity and a currently allocated capacity;

sending other communication nodes terminating the virtual connections a reduction request message including information specifying said particular virtual connection requiring expansion and information specifying each physical link passed by said particular virtual connection;

each of said other communication nodes, which terminate said virtual connections and which receive said reduction request message, perform the acts of:
selecting, among the virtual connections terminated by the communication nodes, an other virtual connection passing a same physical link as said particular virtual connection specified in said reduction request message;

calculating a second new capacity to be allocated to said other virtual connection with reference to said traffic information;

reducing said capacity of said other virtual connection to said second new capacity if the reduction is possible to said second new capacity thus calculated; and sending, to the particular communication node delivering said reduction request message, a reduction response message including information specifying the particular virtual connection specified by said reduction request message and a responded reduction value; and the particular communication node, then performing the acts of:
determining an expandible value with reference to said reduction request message and said responded reduction value contained in each of said reduction response messages received from said other communication nodes having received said reduction request messages, and executing said expansion in capacity of said particular virtual connection requiring expansion with reference to said expandible value.

* * * * *